(12) United States Patent
Abeta et al.

(10) Patent No.: US 6,904,078 B1
(45) Date of Patent: Jun. 7, 2005

(54) CDMA RECEIVER AND CDMA TRANSMITTER/RECEIVER

(75) Inventors: Sadayuki Abeta, Kanagawa (JP); Mamoru Sawahashi, Kanagawa (JP); Fumiyuki Adachi, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 09/446,560

(22) PCT Filed: Apr. 22, 1999

(86) PCT No.: PCT/JP99/02154

§ 371 (c)(1),
(2), (4) Date: Dec. 22, 1999

(87) PCT Pub. No.: WO99/55033

PCT Pub. Date: Oct. 28, 1999

(30) Foreign Application Priority Data

Apr. 23, 1998 (JP) .......................................... 10-113581

(51) Int. Cl.[7] .......................... H04B 1/69; H04B 1/707; H04B 1/713
(52) U.S. Cl. ....................... 375/141; 375/148; 375/219; 375/232
(58) Field of Search ................................ 375/141, 219, 375/152, 232, 148, 347, 147; 370/347, 206, 355; 455/522

(56) References Cited

U.S. PATENT DOCUMENTS

| 5,694,388 | A | * | 12/1997 | Sawahashi et al. | ......... | 370/206 |
|---|---|---|---|---|---|---|
| 5,724,378 | A | * | 3/1998 | Miki et al. | .................... | 375/148 |
| 5,930,288 | A | * | 7/1999 | Eberhardt | .................... | 375/148 |
| 6,496,534 | B1 | * | 12/2002 | Shimizu et al. | ............. | 375/148 |

FOREIGN PATENT DOCUMENTS

| EP | 0715440 A1 | 6/1996 | ........... H04L/27/22 |
|---|---|---|---|
| JP | 07-231285 | 8/1995 | ........... H04B/7/005 |
| JP | WO 95/35615 | 12/1995 | ........... H04L/27/22 |
| JP | 08335898 A | 12/1996 | |
| JP | 09008770 A | 1/1997 | |
| JP | 09-064933 | 3/1997 | ........... H04L/27/38 |
| JP | 09-186635 | 7/1997 | ........... H04B/7/005 |
| JP | 09-232994 | 9/1997 | ........... H04B/1/707 |
| JP | 10051424 A | 2/1998 | |
| JP | 11-127208 | 5/1999 | ........... H04L/27/22 |
| JP | 11-186990 | 7/1999 | ............ H04J/13/04 |
| WO | WO 97/45970 | 12/1997 | ............ H04B/7/26 |
| WO | WO 98/10542 | 3/1998 | ............ H04J/11/00 |

OTHER PUBLICATIONS

The Performance of Channel Estimation Method Using Adaptive Meighted Multi–Symbol Averaging (WMSA) With Pilot Channel in DS–CDMA Sadayuki Abeta, Mamoru Sawahashi, Fumiyuki Adachi.

Channel Estimation Using Time Multiplexed Pilot Symbols for Coherent Rake Combining for DS–CDMA Mobile Radio H. Andoh, M. Sawahashi & F. Adachi 1997 IEEE p. 954–958.

(Continued)

Primary Examiner—Stephen Chin
Assistant Examiner—Curtis Odom
(74) Attorney, Agent, or Firm—Workman Nydegger

(57) ABSTRACT

A CDMA receiver and a CDMA transceiver are provided which have high resistance to fading fluctuations, and carry out highly accurate channel estimation, considering the rate of channel fluctuations. When carrying out the channel estimation by calculating weighted sums of the (average values of) pilot symbols interposed into a data symbol sequence, the weighting control is performed considering the rate of the channel fluctuations. For example, the weighting control is carried out using, as its update values, inner products of the channel estimation values and the (average values of) pilot symbols. This makes it possible to achieve the highly accurate channel estimation.

19 Claims, 25 Drawing Sheets

OTHER PUBLICATIONS

Seeichi Sampei and Terumi Sunaga, "Rayleigh Fading Compensation for QAM in Land Mobile Radio Communications", IEEE Trans. Vehicular Technol. VT–42, No. 2, May 1993.

Seeichi Sampei, "Rayleigh Fading Compensation Method for 16QAM MODEM in Digital Land Mobile Radio Systems".

Hidehiro Andoh et al., "Channel Estimation Filter Using Time–Multiplexed Pilot Channel for Coherent RAKE Combining in DS–CDMA", Mobile Radio, IEICE Trans. Commun. vol. 81–B, No. 7, Jul. 1998.

H. Andoh et al. "Performance of Pilot Symbols–Assisted Coherent RAKE Receiver Using Weighted Multi–Slot Averaging for DS–CDMA Mobile Radio", Technical Report of IEICE. RCS97–74 (Jul. 1997).

Sadayuki Abeta et al., "Performance Comparison Between Time–Multiplexed Pilot Channel and Parallel Pilot Channel for Coherent Rake Combining in DS–CDMA Mobile Radio", IEICE Trans. Commun. vol. 81–B, No. 7, Jul. 1998.

Sadayuki Abeta et al., "The Performance of Channel Estimation method using Weighted Multi–Symbol Averaging (WMSA) with Pilot Channel in DS–CDMA", Technical Report of IEICE. RCS97–163 (Nov. 1997).

Sadayuki Abeta et al., "DS/CDMA Coherent Detection System with a Suppressed Pilot Channel", IEEE Globecom'94 pp. 1622–1626, 1994.

Sadayuki Abeta et al., "A Coherent Detection System with a Supressed Pilot Channel for DS/CDMA Systems", unknown publisher, 1994.

* cited by examiner

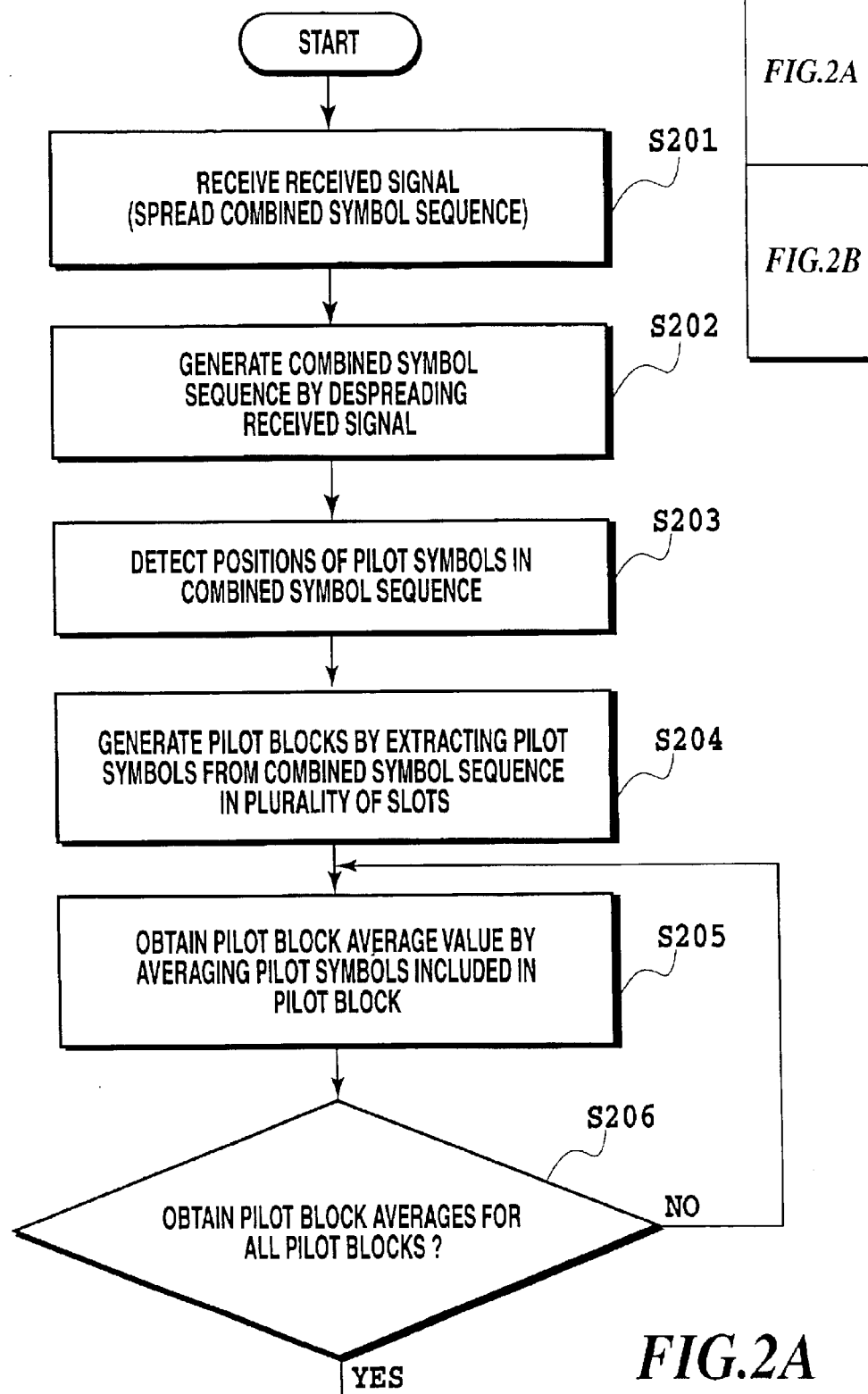

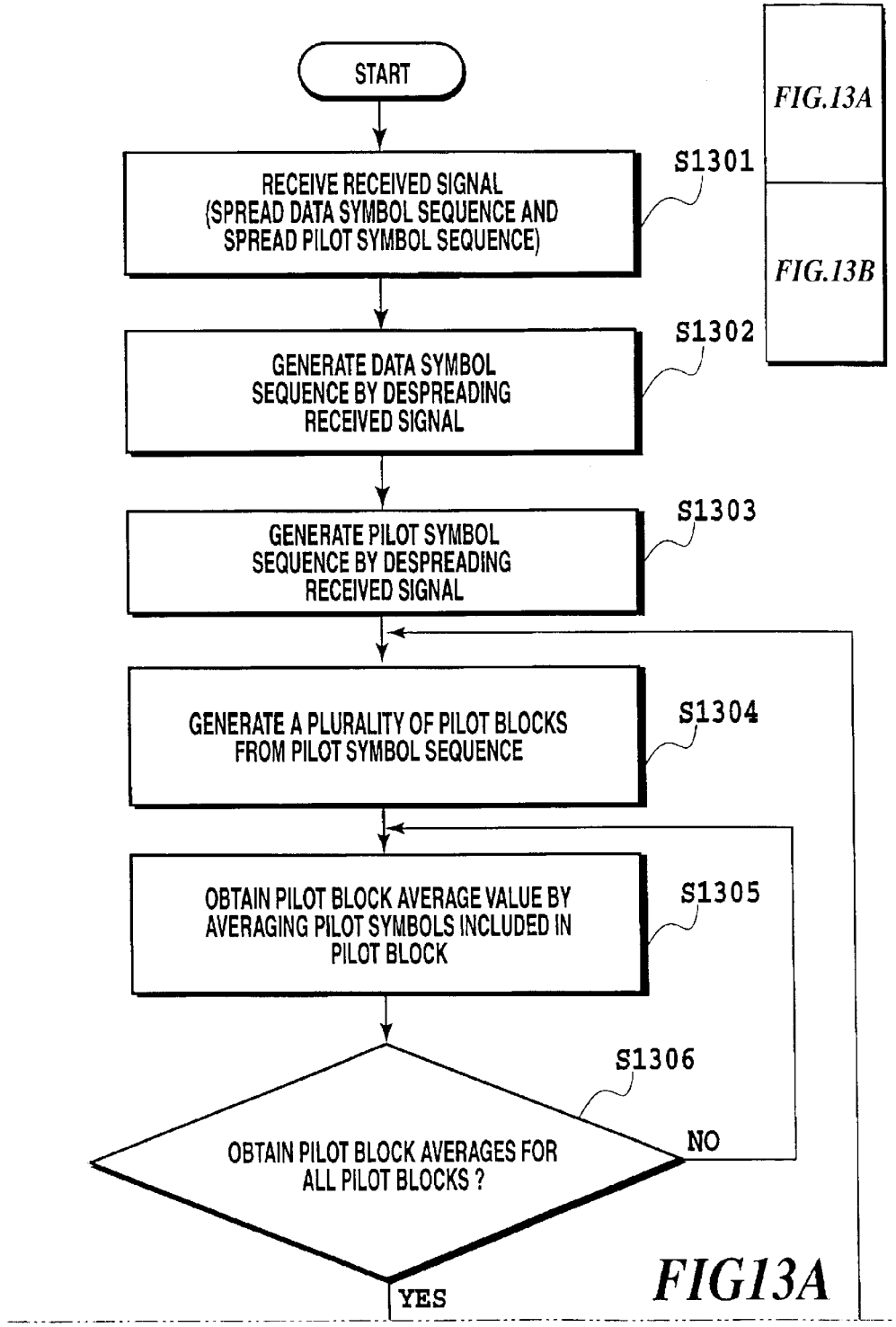

CDMA RECEIVER AND CDMA TRANSMITTER/RECEIVER

TECHNICAL FIELD

The present invention relates to a CDMA (Code Division Multiple Access) receiver and a CDMA transceiver which have high resistance to fading fluctuations, and carry out highly accurate channel estimation, considering the rate of channel fluctuations (propagation path fluctuations).

BACKGROUND ART

In a mobile communication environment, fluctuations in amplitude and phase can take place in a propagation channel because of Rayleigh fading caused by variations in relative locations of a mobile station and a base station. Therefore, it is common for a conventional phase modulation method which transmits data (information) by carrier phase to impose data on relative phases of successive symbols by differential encoding on a transmitting side, and to make identification and decision of the data by differential detection on a receiving side.

In the differential detection, however, one bit error in a radio section causes two bit error because the data to be transmitted is modulated with the differential encoding as mentioned above. Thus, under the same SNIR (Signal to Noise and Interference power Ratio), the received error rate will increase by 3 dB from that of the coherent detection such as binary phase shift keying (BPSK).

On the other hand, although the coherent detection that decides the phase of a received signal for each data symbol by the absolute phase has highly efficient receiving characteristics, it is difficult to decide the received absolute phase in a Rayleigh fading environment.

To solve the problem, a method is proposed that insert pilot symbols into a data symbol sequence, and carries out channel estimation of the data symbols using the pilot symbols. As a pilot symbol insertion method, there are a time multiplexed pilot channel method that inserts pilot symbols between data symbols, and a parallel pilot channel method that inserts pilot symbols in parallel with data symbols.

The following references 1–3 propose a channel estimation method based on the time multiplexed pilot channel method.

Reference 1: Seiichi Sampei and Terumi Sunaga, "Rayleigh Fading Compensation for QAM in Land Mobile Radio Communication", IEEE Trans. Vehicular Technol. VT-42, No.2, May 1993. It proposes a method of estimating and compensating for the fading distortion using pilot symbols that are inserted between data symbols at fixed intervals and have known phases. In this method, a pilot symbol is inserted at every several data symbol intervals, and the channel estimation is carried out based on the received phases of the pilot symbols. In other words, it measures the amplitude and phase of the received signal of each path of each user at the pilot symbols before and after the current data symbol section, and estimates the channel fluctuations in the data symbol section by interpolating the measured values.

Reference 2: Hidehiro Ando et.al, "Channel Estimation Filter Using Time-Multiplexed Pilot Channel for Coherent RAKE Combining in DS-CDMA", Mobile Radio, IEICE Trans. Commun. Vol.81-B, No.7, July 1998. It proposes a method of carrying out more highly accurate channel estimation by making channel estimation using more pilot symbols.

FIG. 23 is a diagram illustrating a channel estimation method based on the reference 2. In this method, the transmission power control is carried out at every slot interval to follow instantaneous Rayleigh fluctuations. Therefore, as illustrated in FIG. 23, the amplitude (power) of the combined symbol sequence of data symbols and pilot symbols varies at every slot interval, and the phase also varies slightly due to the operation of an amplifier during transmission. Such transmission power control enables a reverse channel of the DS-CDMA (Direct Sequence CDMA) to secure the SNIR against interference signals caused by cross-correlation with other users.

The channel estimation of the data symbols is performed using pilot symbols inserted between data symbols at fixed intervals. Specifically, it is carried out by averaging (taking coherent sums of) pilot symbols (estimated complex fading envelopes) in a plurality of slots before and after the slot, to which the data symbols to be subjected to the channel estimation belong, and by obtaining a channel estimation value $\tilde{\xi}$ by taking the weighted sum (weighted average) of the average values $\bar{\xi}$ using weighting factors $\alpha_0$, $\alpha_1$ and so on, thereby achieving highly accurate channel estimation.

Using many pilot symbols belonging to different slots enables highly accurate channel estimation. This is because in an actual mobile propagation environment, interference signals, which are generated by thermal noise (to minimize the transmission power, a noise limited environment is created particularly at cell edges), and by cross-correlation from other users, are added to the desired signal of the current channel, and the channel estimation accuracy is degraded because of the phase and amplitude of the received signal that vary at every moment due to fading. Although the pilot symbols in different slots have different power, the channel estimation error due to the power difference is less than the reduction effect by the thermal noise and interference signals caused from using pilot symbols in more slots.

The reference 2 method assumes that the channel fluctuations in each slot are small, and employs the same weighting factors $\alpha$ for all the data symbols in each slot to obtain the same channel estimation value $\tilde{\xi}$. This presents a problem of impairing the characteristics in high rate fading.

Reference 3, Sadayuki Abeta et.al, "Performance Comparison between Time-Multiplexed Pilot Channel and Parallel Pilot Channel for Coherent Rake Combining in DS-CDMA Mobile Radio", IEICE Trans. Commun. Vol.81-B, No.7, July 1998. It proposes a method of achieving highly accurate channel estimation in making channel estimation of the data symbols by obtaining a channel estimation value by appropriately taking weighted sum of the pilot symbols in a plurality of slots before and after the slot, to which the current data symbols belong, using appropriate weighting factors for each data symbol in the same slot (weighting factors $\alpha_{m,0}, \alpha_{m,1}$ and so on for m-th data symbol in the slot). First to fourth embodiments in accordance with the present invention apply this scheme (see, FIG. 3).

For example, in FIG. 23, for the (m−A)-th data symbol in the n-th slot, where A is a natural number, the pilot symbols in the n-th slot are assigned a greatest weight. This is because the pilot symbols in the n-th slot are closest (in time) to the (m−A)-th data symbol, and hence best reflect the channel state when receiving the data symbols. In contrast, for the (m+B)-th data symbol in the n-th slot, where B is a natural number, the pilot symbols in the (n+1)-th slot are assigned a greatest weight. This is because the pilot symbols in the (n+1)-th slot are closest (in time) to the (m+B)-th data symbol, and hence best reflect the channel state when receiving the data symbols.

As for the parallel pilot channel method, the following reference 4 and the foregoing reference 3 disclose a channel estimation method based on the method.

Reference 4, Sadayuki Abeta et.al, "IDS/CDMA Coherent Detection System with a Suppressed Pilot Channel", IEEE GLOBECOM '94, pp. 1622–1626, 1994. It proposes a method of estimating and compensating for the fading distortion by inserting pilot channel having known phase in parallel with and perpendicular to the data channel for transmitting data.

The channel estimation of the data symbols is carried out by averaging the pilot symbols in a section to which the target data symbol belongs, and by obtaining the channel estimation value. Thus, the channel estimation with high SNIR is achieved. By using the estimation value, the received signal in each path of each user is detected at the positions of the pilot symbols in the current data symbol section, and the amplitude and phase measurement is carried out for the signal of each path so as to estimate and compensate for the channel fluctuations in the data symbol section.

When performing the channel estimation of the data symbols in the reference 4 method, the average of the pilot symbols is calculated only within the slot including the target data symbol, and the average is made the channel estimation value.

The foregoing reference 3 proposes a method of achieving more highly accurate channel estimation by obtaining a more highly accurate channel estimation value by taking weighted sum of the pilot symbols appropriately when carrying out the channel estimation of the data symbols. This method is applied to the fifth to eighth embodiments in accordance with the present invention (see, FIG. 14).

FIG. 14 illustrates the channel estimation method disclosed by the reference 3. In FIG. 14, the channel estimation is carried out using a pilot symbol sequence parallel to the data symbol sequence. Specifically, it obtains the channel estimation value $\bar{\xi}$ by generating a plurality of pilot blocks from the pilot symbols, by averaging the pilot symbols in each of the pilot blocks, and by taking a weighted sum of the average values $\bar{\xi}$ using weighting factors $\alpha_1$, $\alpha_{-1}$ and so on, thereby achieving highly accurate channel estimation. Using many pilot symbols belonging to different slots in carrying out the channel estimation enables the highly accurate channel estimation.

To suppress the power loss, the power of the pilot symbol sequence is set less than that of the data symbol sequence. In addition, to follow the instantaneous Rayleigh fluctuations, the transmission power control is performed at every slot interval. This enables the reverse channel in the DS-CDMA to secure the SNIR against the interference signals caused by the cross-correlation from other users.

The methods disclosed in the foregoing references 3 and 4, however, use constant weighting values regardless of the fading fluctuations. This presents a problem in that when setting optimum weighting values for low rate fading fluctuations, the highly accurate channel estimation cannot be achieved in the high rate fading, whereas when setting optimum weighting values for high rate fading fluctuations, the highly accurate channel estimation cannot be achieved in the low rate fading.

SUMMARY OF THE INVENTION

The present invention is implemented to solve the foregoing problems. It is therefore an object of the present invention to improve the resistance to fading fluctuations and to carry out the highly accurate channel estimation by adaptively optimizing the weighting values for the pilot symbols in response to the rate of channel fluctuations.

Achieving highly accurate channel estimation and compensation of channel fluctuations of data symbols based on the channel estimation makes it possible to decide the absolute phase of each data symbol under a Rayleigh fading environment using the coherent detection, and to reduce the SNIR required for obtaining a predetermined level of receiving quality (receiving error rate). Therefore, the transmission power can be reduced, and the capacity in terms of the number of users of the system can be increased.

In order to accomplish the object aforementioned, according to the invention as claimed in claim 1, a CDMA receiver for receiving and demodulating a signal including a combined symbol sequence that has a plurality of slots and includes data symbols and pilot symbols, comprises:

means for detecting positions of the pilot symbols in the combined symbol sequence;

means for generating pilot blocks by extracting in a plurality of slots the pilot symbols from the combined symbol sequence in response to a result of the detection;

means for obtaining channel estimation values by calculating a weighted sum of average values of the pilot symbols in the pilot blocks;

means for acquiring from the combined symbol sequence a data symbol sequence in accordance with the result of the detection;

means for compensating for channel fluctuations of the data symbol sequence using the channel estimation values; and means for controlling the weighting in response to a rate of the channel fluctuations.

According to the invention as claimed in claim 2, in the CDMA receiver as claimed in claim 1, the means for controlling the weighting comprises:

means for compensating for, using the channel estimation values, channel fluctuations of a pilot symbol sequence extracted from the combined symbol sequence;

means for generating an error signal from the compensated pilot symbol sequence and an ideal pilot symbol sequence; and means for carrying out the weighting control using the error signal and the average values of the pilot symbols included in the pilot blocks.

According to the invention as claimed in claim 3, in the CDMA receiver as claimed in claim 1, the means for controlling the weighting comprises:

means for generating an error signal from the compensated data symbol sequence and from result obtained by demodulating and deciding the compensated data symbol sequence; and means for carrying out the weighting control using the error signal and the average values of the pilot symbols included in the pilot blocks.

According to the invention as claimed in claim 4, in the CDMA receiver as claimed in claim 1, the means for controlling the weighting carries out the weighting control using as update values inner products of the channel estimation values of the data symbols and the average values of the pilot symbols included in the pilot blocks.

According to the invention as claimed in claim 5, in the CDMA receiver as claimed in claim 1, the CDMA receiver receives a signal including a combined symbol sequence having a frame structure consisting of slots in which the pilot symbols consisting of a few symbols are inserted into the data symbol sequence at every fixed interval.

According to the invention as claimed in claim 6, in the CDMA receiver as claimed in claim 1, the pilot blocks are formed from all the pilot symbols in a slot.

According to the invention as claimed in claim 7, in the CDMA receiver as claimed in claim 1, when obtaining the channel estimation value of a data symbol in an n-th slot of the combined symbol sequence, where n is an integer, the pilot blocks are generated from an (n−K+1)-th slot to an (n+K)-th slot of the combined symbol sequence, where K is a natural number.

According to the invention as claimed in claim 8, a CDMA receiver for receiving and demodulating a signal including a data symbol sequence and a pilot symbol sequence parallel to the data symbol sequence, comprises:

means for generating a plurality of pilot blocks from the pilot symbol sequence;

means for obtaining channel estimation values by calculating a weighted sum of average values of the pilot symbols in the pilot blocks;

means for compensating for channel fluctuations of the data symbol sequence using the channel estimation values; and means for controlling the weighting in response to a rate of the channel fluctuations.

According to the invention as claimed in claim 9, in the CDMA receiver as claimed in claim 8, the means for controlling the weighting comprises:

means for compensating for, using the channel estimation values, channel fluctuations of the pilot symbol sequence;

means for generating an error signal from the compensated pilot symbol sequence and an ideal pilot symbol sequence; and means for carrying out the weighting control using the error signal and the average values of the pilot symbols included in the pilot blocks.

According to the invention as claimed in claim 10, in the CDMA receiver as claimed in claim 8, the means for controlling the weighting comprises:

means for generating an error signal from the compensated data symbol sequence and from result obtained by demodulating and deciding the compensated data symbol sequence; and means for carrying out the weighting control using the error signal and the average values of the pilot symbols included in the pilot blocks.

According to the invention as claimed in claim 11, in the CDMA receiver as claimed in claim 8, the means for controlling the weighting carries out the weighting control using as update values inner products of the channel estimation values of the data symbols and the average values of the pilot symbols included in the pilot blocks.

According to the invention as claimed in claim 12, in the CDMA receiver as claimed in claim 8, the CDMA receiver receives a signal including a data symbol sequence which is spread using a first spreading code, and a pilot symbol sequence which is parallel to the data symbol sequence and spread using a second spreading code, the first spreading code and the second spreading code being orthogonal to each other.

According to the invention as claimed in claim 13, in the CDMA receiver as claimed in claim 8, the CDMA receiver receives a signal including a spread data symbol sequence which is impressed on a first carrier, and a spread pilot symbol sequence which is parallel to the data symbol sequence and is impressed on a second carrier, the first carrier and the second carrier being orthogonal to each other.

According to the invention as claimed in claim 14, in the CDMA receiver as claimed in claim 8, when obtaining the channel estimation value of an n-th data symbol in the data symbol sequence, where n is an integer, the plurality of pilot blocks are generated from an (n—K+1)-th pilot symbol to an (n+K)-th pilot symbol in the pilot symbol sequence, where K is a natural number.

According to the invention as claimed in claim 15, in the CDMA receiver as claimed in claim 8, the plurality of pilot blocks have a same length.

According to the invention as claimed in claim 16, a CDMA transceiver includes a transmitting section for transmitting a signal including a combined symbol sequence that has a plurality of slots and includes data symbols and pilot symbols, and a receiving section for receiving and demodulating the signal, and the receiving section comprises:

means for detecting positions of the pilot symbols in the combined symbol sequence;

means for generating pilot blocks by extracting, in a plurality of slots, the pilot symbols from the combined symbol sequence in response to a result of the detection;

means for obtaining channel estimation values by calculating a weighted sum of average values of the pilot symbols included in the pilot blocks;

means for acquiring from the combined symbol sequence a data symbol sequence in accordance with the result of the detection;

means for compensating for channel fluctuations of the data symbol sequence using the channel estimation values; and means for controlling the weighting in response to a rate of the channel fluctuations.

According to the invention as claimed in claim 17, a CDMA transceiver includes a transmitting section for transmitting a signal including a data symbol sequence and a pilot symbol sequence parallel to the data symbol sequence, and a receiving section for receiving and demodulating the signal, and the receiving section comprises:

means for generating a plurality of pilot blocks from the pilot symbol sequence;

means for obtaining channel estimation values by calculating a weighted sum of average values of the pilot symbols in the pilot blocks;

means for compensating for channel fluctuations of the data symbol sequence using the channel estimation values; and means for controlling the weighting in response to a rate of the channel fluctuations.

According to the invention as claimed in claim 18, a CDMA receiving method of receiving and demodulating a signal including a combined symbol sequence that has a plurality of slots and includes data symbols and pilot symbols, comprises the steps of:

detecting positions of the pilot symbols in the combined symbol sequence;

generating pilot blocks by extracting, in a plurality of slots, the pilot symbols from the combined symbol sequence in response to a result of the detection;

obtaining channel estimation values by calculating a weighted sum of average values of the pilot symbols in the pilot blocks;

acquiring from the combined symbol sequence a data symbol sequence in accordance with the result of the detection; and compensating for channel fluctuations of the data symbol sequence using the channel estimation value, wherein the weighting is controlled in response to a rate of the channel fluctuations.

According to the invention as claimed in claim 19, a CDMA receiving method of receiving and demodulating a signal including a data symbol sequence and a pilot symbol sequence parallel to the data symbol sequence, comprises the steps of:

generating a plurality of pilot blocks from the pilot symbol sequence;

obtaining channel estimation values by calculating a weighted sum of average values of the pilot symbols in the pilot blocks; and compensating for channel fluctuations of the data symbol sequence using the channel estimation value, wherein the weighting is controlled in response to a rate of the channel fluctuations.

BRIEF DESCRIPTION OF THE DRAWINGS

FIG. 2 is a diagram showing relationship between FIGS. 2A and 2B;

FIG. 2A is a flowchart illustrating a receiving processing by the CDMA receiver of the first embodiment in accordance with the present invention;

FIG. 13 is a diagram showing relationship between FIGS. 13A and 13B;

FIG. 13A is a flowchart illustrating a receiving processing by the CDMA receiver of the fifth embodiment in accordance with the present invention;

BEST MODE FOR CARRYING OUT THE INVENTION

The best mode for carrying out the invention will now be described with reference to the accompanying drawings.

First to fourth embodiments in accordance with the present invention relates to a CDMA receiver or a CDMA transceiver based on the time multiplexed pilot channel method, and fifth to eighth embodiments in accordance with the present invention relates to a CDMA receiver or a CDMA transceiver based on the parallel pilot channel method.

[First Embodiment]

Figure 1:
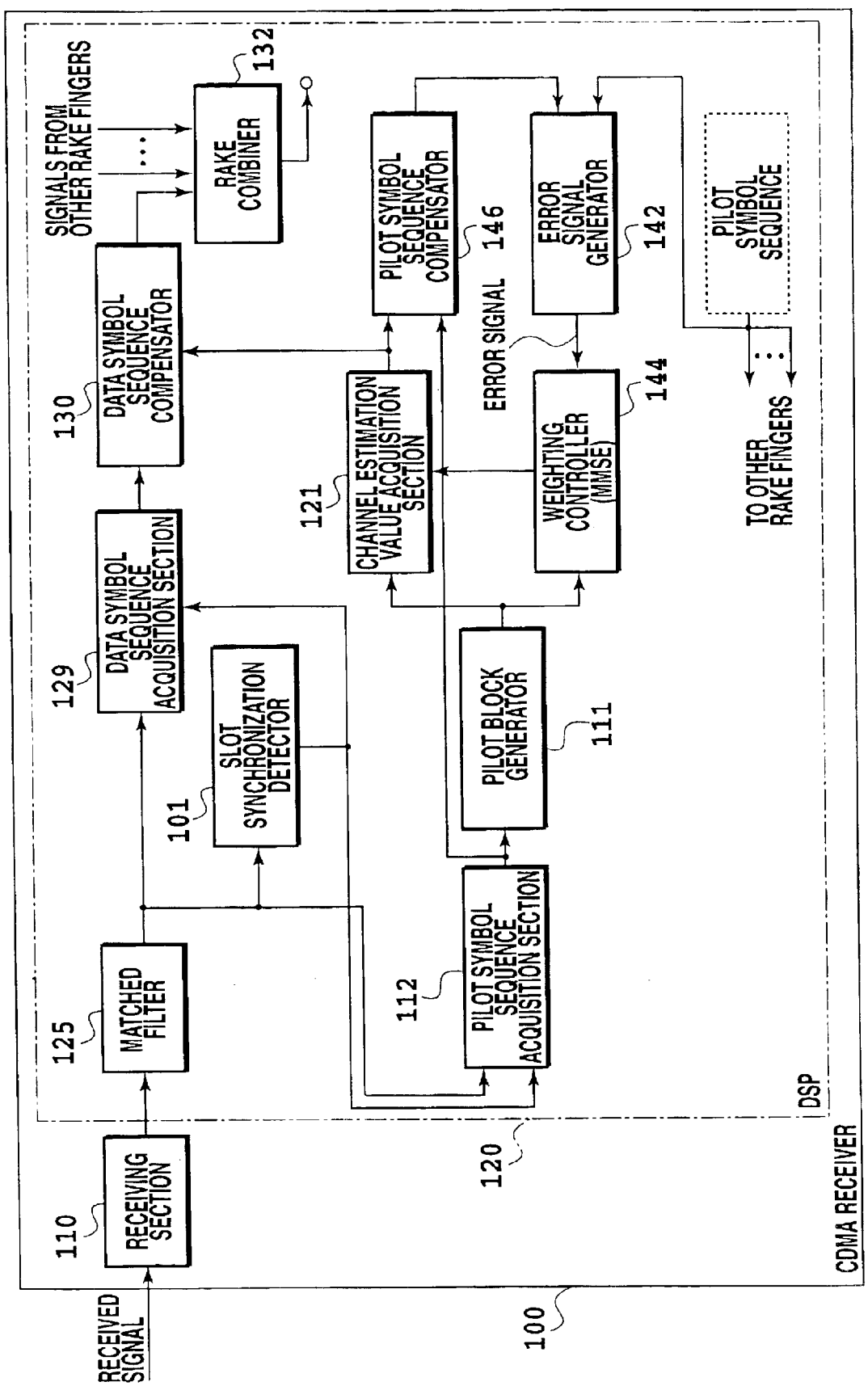
FIG. 1 is a block diagram showing a configuration of a CDMA receiver of a first embodiment in accordance with the present invention.

FIG. 1 is a block diagram showing a configuration of a CDMA receiver of a first embodiment in accordance with the present invention. The CDMA receiver 100 of the present embodiment receives and demodulates a signal including a combined symbol sequence that has a plurality of slots and includes data symbols and pilot symbols.

The CDMA receiver 100 comprises a receiving section 110, a matched filter 125, a slot synchronization detector 101, a pilot symbol sequence acquisition section 112, a pilot block generator 111, a channel estimation value acquisition section 121, a data symbol sequence acquisition section 129, a data symbol sequence compensator 130, a RAKE combiner 132, an error signal generator 142, and a weighting controller (MMSE) 144. Although in the present embodiment, the matched filter 125, slot synchronization detector 101 and the like are implemented by software using a DSP (Digital Signal Processor) (plus a memory for storing programs). 120 as shown in FIG. 1, they can be implemented by means of hardware, in which case delay circuits and other components are used as needed.

Figure 2B:
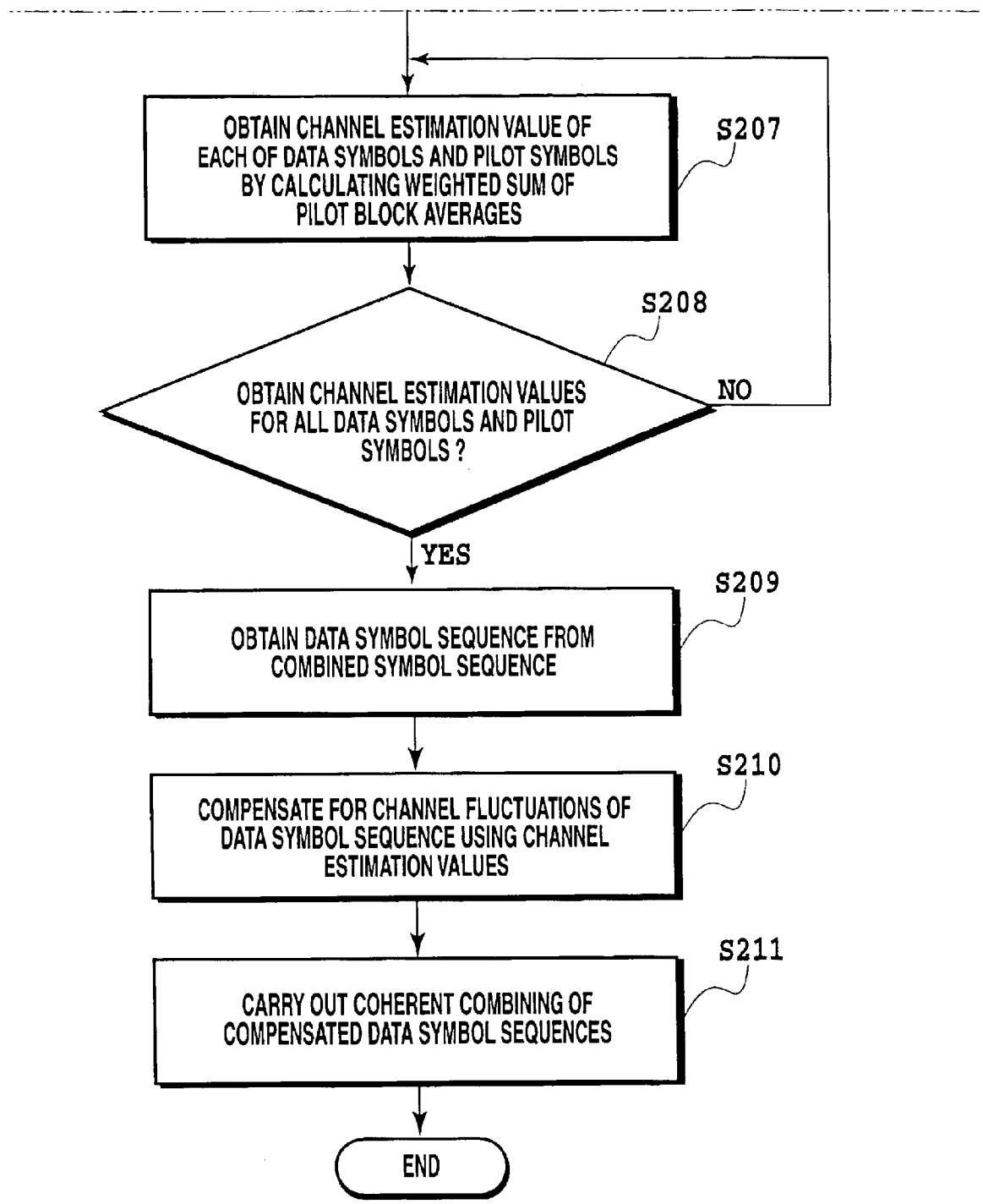
FIG. 2B is a flowchart illustrating the receiving processing by the CDMA receiver of the first embodiment in accordance with the present invention.

FIGS. 2A and 2B are a flowchart illustrating a receiving processing by the CDMA receiver of the present embodiment. First, at step S201, the receiving section 110 receives a receiving signal, that is, a spread combined symbol sequence. At step S202, the matched filter 125 despreads the received signal to generate a combined symbol sequence. Subsequently, at steps S203–S208, the slot synchronization detector 101, pilot symbol sequence acquisition section 112, pilot block generator 111 and channel estimation value acquisition section 121 carry out the channel estimation processing, thereby acquiring channel estimation values of the data symbols and pilot symbols.

Figure 3:
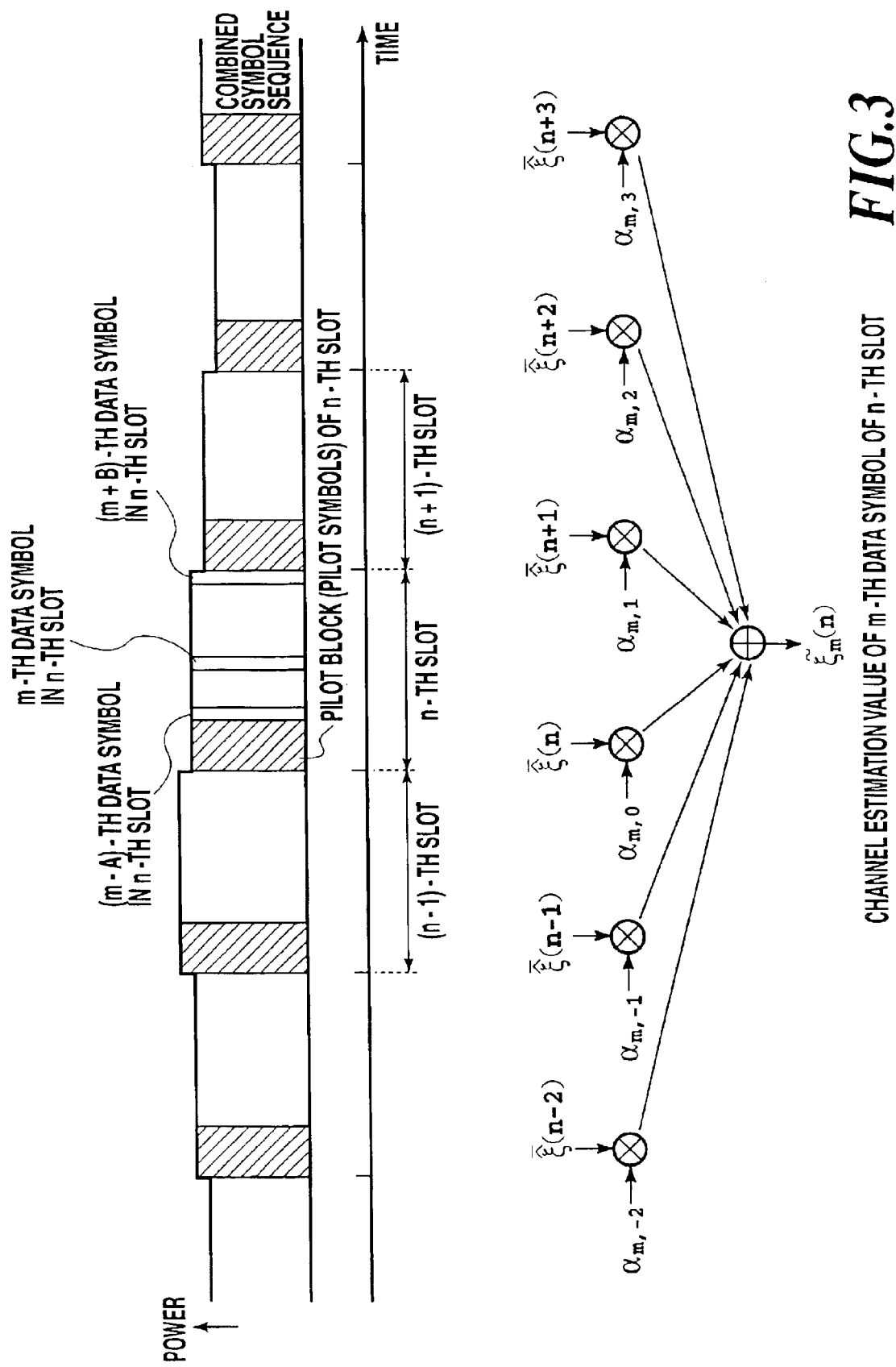
FIG. 3 is a diagram illustrating the operation principle of the channel estimation by the CDMA receiver of the first embodiment in accordance with the present invention, taking an example of the channel estimation.

FIG. 3 is a diagram illustrating the operation principle of the channel estimation by a channel estimation unit of the present embodiment by way of example of acquiring channel estimation values of an m-th data symbol in n-th slot, where n and m are integers. The combined symbol sequence in the example as shown in FIG. 3 is subjected to the transmission power control at every slot interval. Each slot of the combined symbol sequence has a form in which a fixed length pilot symbols are followed by a fixed length data symbols. In other words, the combined symbol sequence has a frame structure in which a unit of a few pilot symbols is inserted into the data symbol sequence at every fixed interval.

Alternatively, the length of the data symbols and/or pilot symbols in each slot of the combined symbol sequence may be one symbol length, or made variable. Besides, there may be a slot consisting of only the data symbols or pilot symbols. In addition, the arrangement of the data symbols and pilot symbols in each slot can be free.

Returning to FIG. 2A, the slot synchronization detector 101 detects the position of the pilot symbols in the combined symbol sequence at step S203.

Subsequently, at step S204, the pilot symbol sequence acquisition section 112 and pilot block generator 111 extract the pilot symbols from a plurality of slots in the combined symbol sequence, and generates pilot blocks. Specifically, the pilot symbol sequence acquisition section 112 acquires the pilot symbols (sequence) from the plurality of slots on the basis of the detection result at step S203, and the pilot block generator 111 generates pilot blocks from the pilot symbols acquired.

In the example as shown in FIG. 3, the pilot symbols are extracted from the combined symbol sequence over a range from the (n−K+1)-th slot to the (n+K)-th slot, where K is a natural number and is set at three in FIG. 3, to generate pilot blocks. A pilot block is a set of the pilot symbols.

Although each pilot block is formed from all the pilot symbols in a slot in the present embodiment, it can be formed from part of the pilot symbols in the slot. It is also possible to form one pilot block from one pilot symbol. Besides, the number of pilot symbols in a pilot block can be made variable from slot to slot.

When obtaining the channel estimation values of the data symbols in the n-th slot, it is not essential to form the pilot blocks from nearly the same numbers of the slots before and after the n-th slots as in the example of FIG. 3. For example, the pilot blocks can be generated only from the slots with the number smaller than (previous to) the n-th slot, considering the delay of the channel estimation.

Through steps S205–S208, the channel estimation value acquisition section 121 acquires the channel estimation values of the data symbols and pilot symbols. First, at step S205, it averages the pilot symbols $\xi$ estimated complex fading envelopes) contained in each pilot block, thereby obtaining a pilot block average value $\bar{\xi}$. This step is carried out for all the pilot blocks (step S206). When a pilot block consists of only one pilot symbol, the pilot symbol $\xi$ itself is adopted as the pilot block average value $\bar{\xi}$. In the example as shown in FIG. 3, pilot block average values $\bar{\xi}$ (n+i) are obtained for the pilot blocks in the (n+i)-th slots, where i varies from −K+1 to K (K=3).

At step S207, the channel estimation values $\tilde{\xi}_m$ of the data symbols and pilot symbols are obtained by taking a weighted sum of the pilot block average values $\bar{\xi}$ weighted by the weighting factors α, respectively. In the example of FIG. 3, the channel estimation value $\tilde{\xi}_m$ (n) is obtained for the m-th data symbol in the n-th slot with placing the weighting factors of the (n+i)-th pilot blocks at $\alpha_{m,i}$.

In the present embodiment, the channel estimation values are also obtained for the pilot symbols to carry out the weighting control. The channel estimation values are obtained in the same manner as those of the data symbols. Specifically, the channel estimation value $\tilde{\xi}_m$ (n) is obtained for the m-th pilot symbol in the n-th slot with placing the weighting factors of the (n+i)-th pilot block at $\alpha_{m,i}$.

The channel estimation value $\tilde{\xi}_m$ (n) is given by the following equation (1).

$$\tilde{\xi}_m(n) = \sum_{i=-K+1}^{K} \alpha_{m,i} \cdot \bar{\xi}(n+i) \qquad (1)$$

The foregoing step S207 is repeated for all the data symbols and pilot symbols for which the channel estimation values are to be obtained (step S208).

It is also possible to use the same weighting factors for all the data symbols and pilot symbols in one slot to obtain the channel estimation values.

At step S209 after obtaining the channel estimation values, the data symbol sequence acquisition section 129 obtains the data symbol sequence from the combined symbol sequence on the basis of the detection result of the slot synchronization detector 101.

At step S210, the data symbol sequence compensator 130 compensates for the channel fluctuations (fading phase fluctuations) of the data symbol sequence using the channel estimation values $\tilde{\xi}_m$ (of the data symbols) obtained through steps S203–S208. More specifically, it compensates for the channel fluctuations of the data symbols by multiplying the data symbol sequence by the complex conjugates of the channel estimation values $\tilde{\xi}_m$.

At step S211, the RAKE combiner 132 carries out coherent combining of the compensated data symbol sequences fed from respective RAKE fingers.

Figure 4:
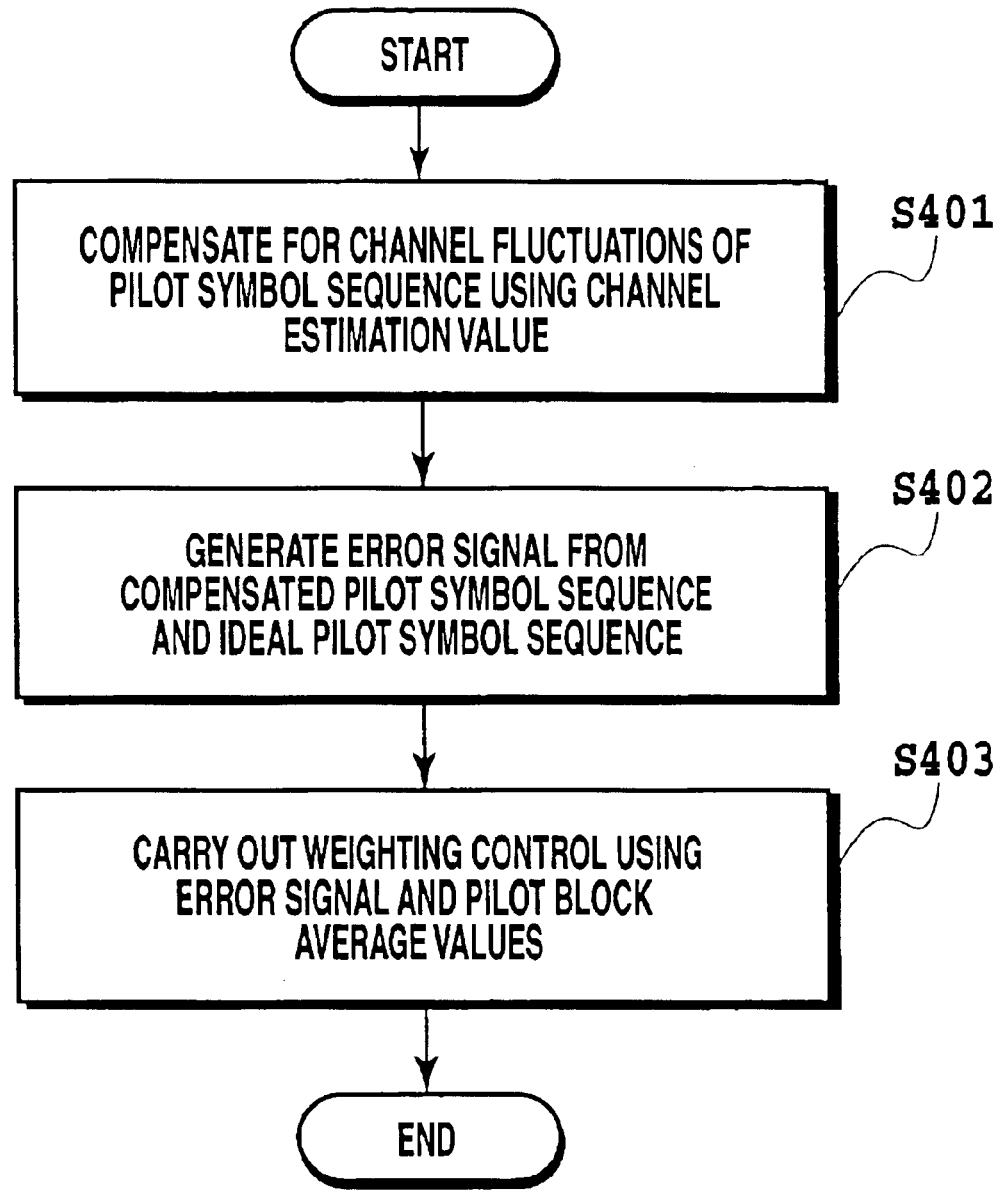
FIG. 4 is a flowchart illustrating a weighting control processing by the CDMA receiver of the first embodiment in accordance with the present invention.

FIG. 4 is a flowchart illustrating a weighting control processing by the CDMA receiver of the present embodiment. At step S401, the pilot symbol sequence compensator 146 compensates for the channel fluctuations of the pilot symbol sequence using the channel estimation values $\tilde{\xi}_m$ (of the pilot symbols) obtained through steps S203–S208.

At step S402, the error signal generator 142 generates an error signal (identification error information) from the compensated pilot symbol sequence and ideal pilot symbol sequence (which is free from the channel fluctuations). The ideal pilot symbol sequence is known, and is prepared in advance in the receiver 100.

At step S403, the weighting controller (MMSE) 144 controls the weighting (weighting factors $\alpha_{m,i}$), using the error signal and the pilot block average values (the channel estimation values obtained from individual pilot blocks) $\bar{\xi}$ as feedback information.

Thus adaptively optimizing the weighting values for the pilot symbols in response to the channel fluctuation rate makes it possible to improve the resistance to fading fluctuations, and to carry out the highly accurate channel estimation.

[Second Embodiment]

Figure 5:
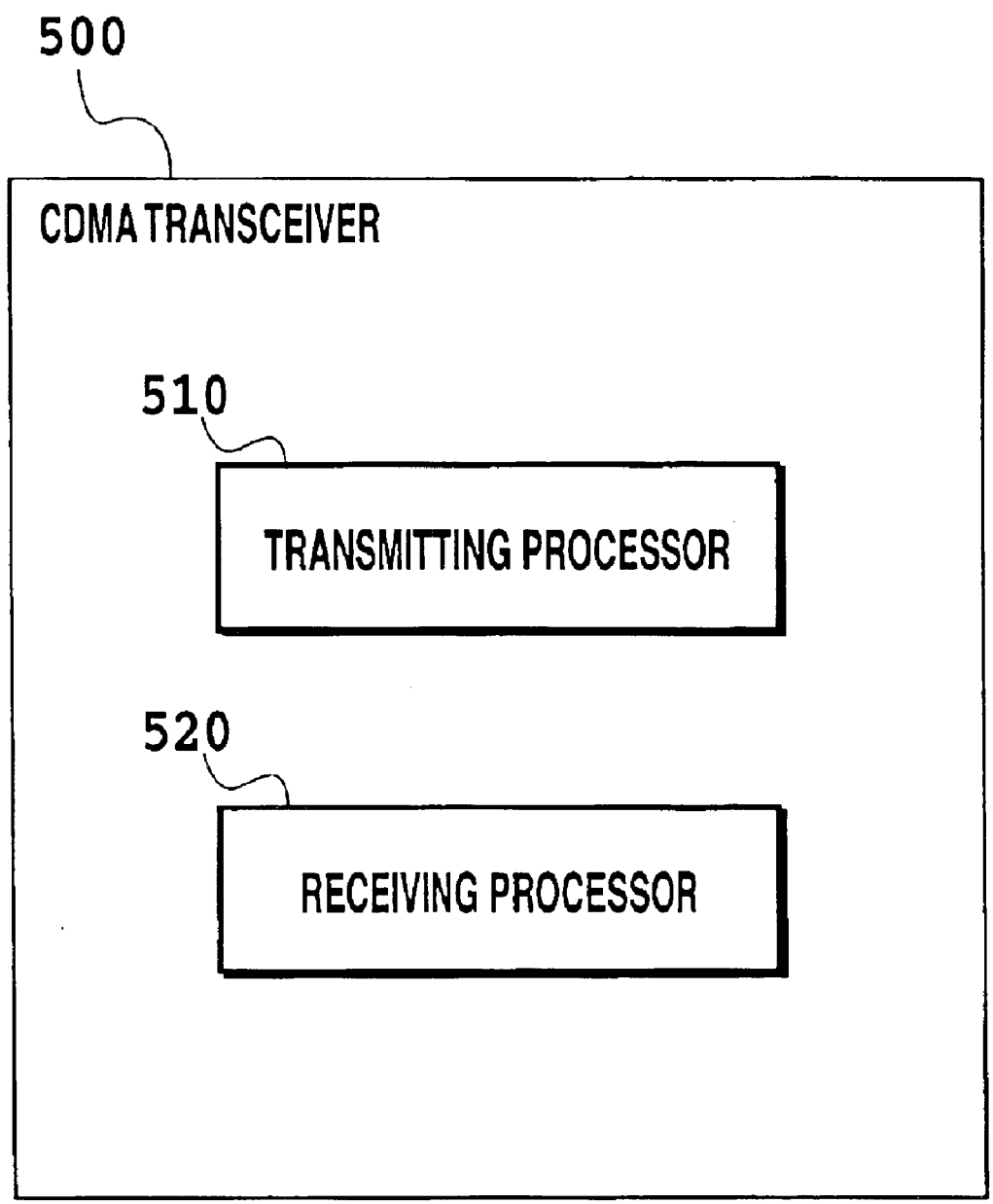
FIG. 5 is a block diagram showing a configuration of a CDMA transceiver of a second embodiment in accordance with the present invention.

FIG. 5 is a block diagram showing a configuration of a CDMA transceiver of a second embodiment in accordance with the present invention.

The CDMA transceiver 500 of the present embodiment transmits a signal including a combined symbol sequence that has a plurality of slots and includes data symbols and pilot symbols, and receives and demodulates such a signal.

The CDMA transceiver 500 comprises a transmitting processor 510 and a receiving processor 520. The configuration, receiving processing and weighting control processing of the receiving processor 520 are the same as the configuration (FIG. 1), receiving processing (FIGS. 2A and 2B) and weighting control processing (FIG. 4) of the CDMA receiver 100 of the first embodiment in accordance with the present invention.

Figure 6:
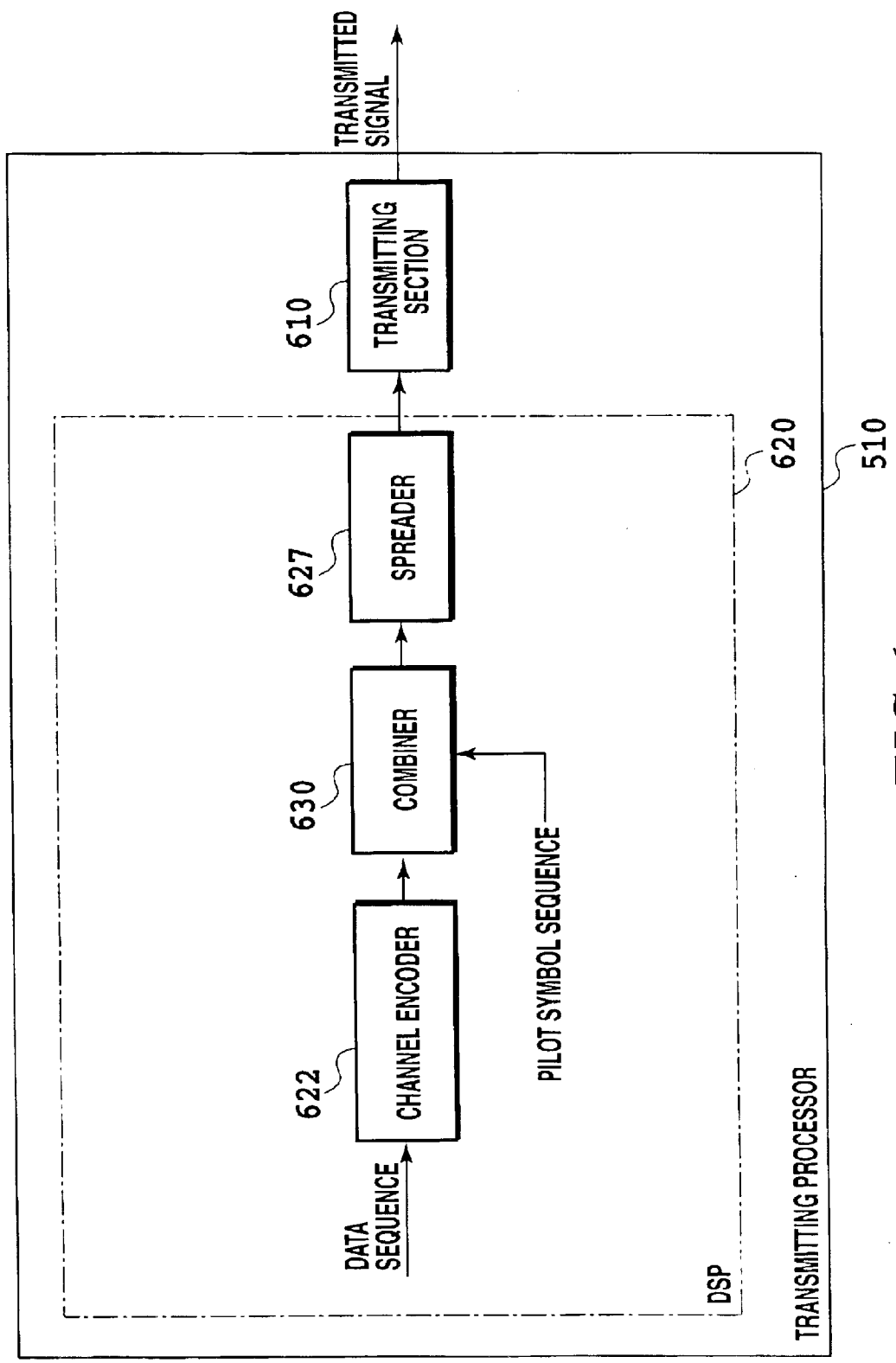
FIG. 6 is a block diagram showing a configuration of a transmission processor of the CDMA transceiver in the second embodiment in accordance with the present invention.

FIG. 6 is a block diagram showing a configuration of the transmitting processor of the CDMA transceiver in the second embodiment. As shown in FIG. 6, the transmitting processor 510 comprises a transmitting section 610, a channel encoder 622, a combiner 630 and a spreader 627. Although in the present embodiment, the channel encoder 622, combiner 630 and the like are implemented by software using a DSP (plus a memory for storing programs) 620 as shown in FIG. 6, they can be implemented by means of hardware.

Figure 7:
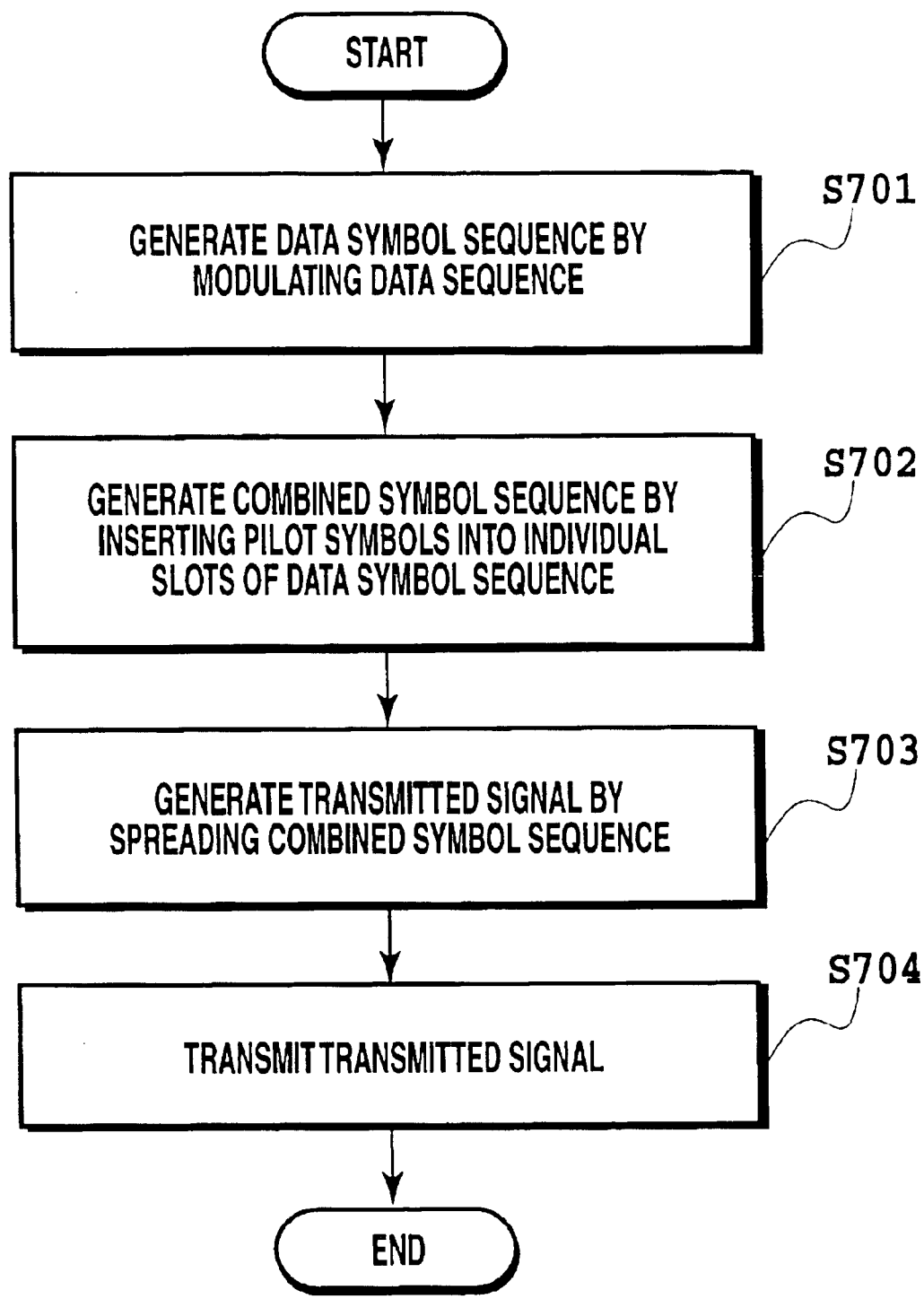
FIG. 7 is a flowchart illustrating a transmission processing by the transmission processor of the CDMA transceiver in the second embodiment in accordance with the present invention.

FIG. 7 is a flowchart illustrating a transmission processing by the transmitting processor of the CDMA transceiver in the present embodiment. First, at step S701, the channel encoder 622 modulates (encodes) a data sequence, thereby generating a data symbol sequence. At step S702, the combiner 630 inserts pilot symbols into each slot of the data symbol sequence, thereby generating a combined symbol sequence. At step S703, the spreader 627 spreads the combined symbol sequence, thereby generating a transmitted signal (spread combined symbol sequence). At step S704, the transmitting section 610 transmits the transmitted signal.

[Third Embodiment]

Figure 8:
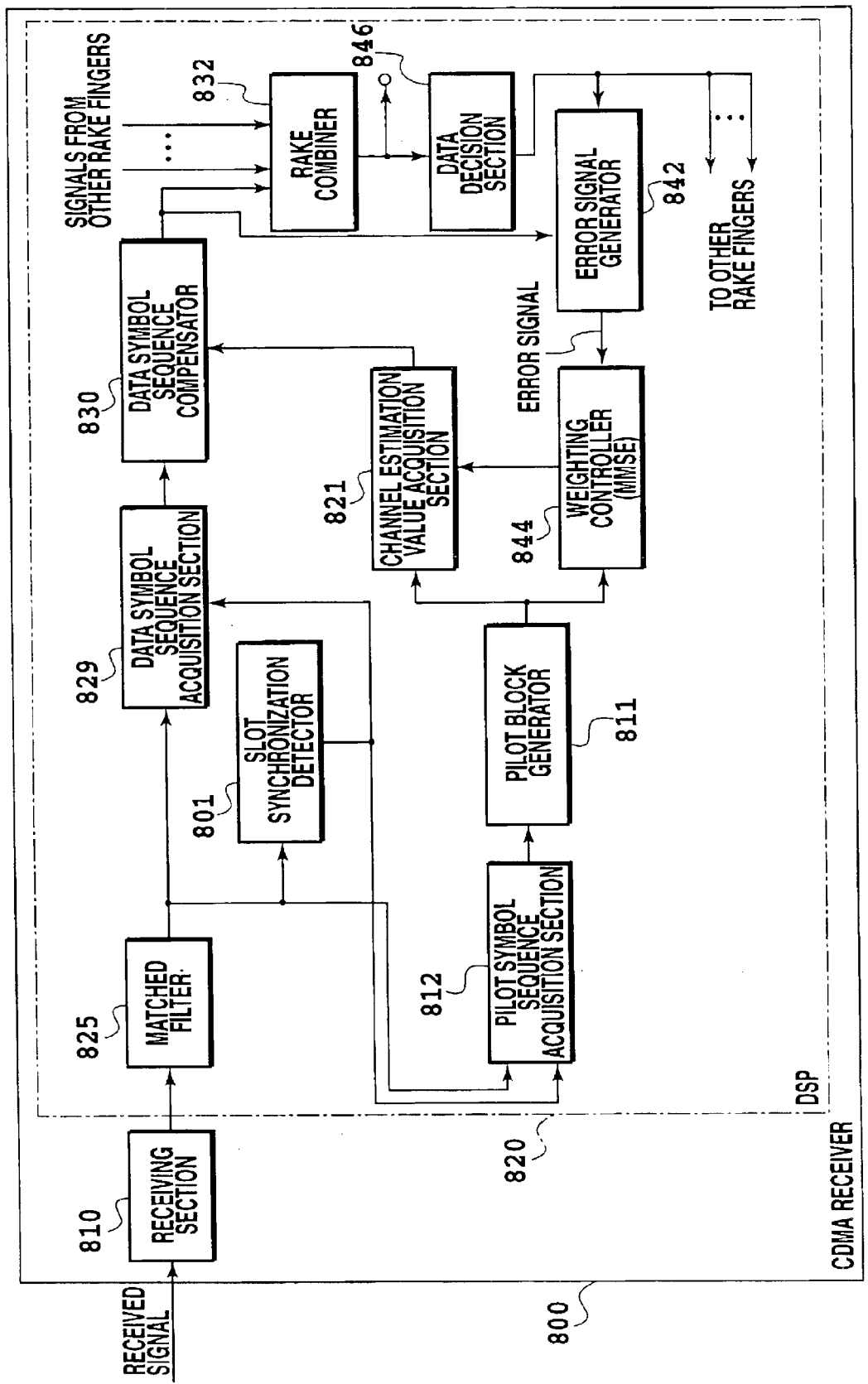
FIG. 8 is a block diagram showing a configuration of the CDMA receiver of a third embodiment in accordance. with the present invention.

FIG. 8 is a block diagram showing a CDMA receiver of a third embodiment in accordance with the present invention. The CDMA receiver 800 of the present embodiment receives a signal including a combined symbol sequence that has a plurality of slots and contains data symbols and pilot symbols.

The CDMA receiver 800 comprises a receiving section 810, a matched filter 825, a slot synchronization detector 801, a pilot symbol sequence acquisition section 812, a pilot block generator 811, a channel estimation value acquisition section 821, a data symbol sequence acquisition section 829, a data symbol sequence compensator 830, a RAKE combiner 832, a data decision section 846, an error signal generator 842, and a weighting controller (MMSE) 844. Although in the present embodiment, the matched filter 825, slot synchronization detector 801 and the like are implemented by software using a DSP (plus a memory for storing programs) 820 as shown in FIG. 8, they can be implemented by means of hardware. The configurations and functions of the receiving section 810, matched filter 825 and the like are the same as those of their counterparts in the CDMA receiver 100 in the first embodiment in accordance with the present invention. In addition, the CDMA receiver 800 of the present embodiment carries out the same processing as the receiving processing (FIGS. 2A and 2B) of the CDMA receiver 100 in the first embodiment in accordance with the present invention, except that it is unnecessary to obtain the channel estimation values of the pilot symbols in the present embodiment.

Figure 9:
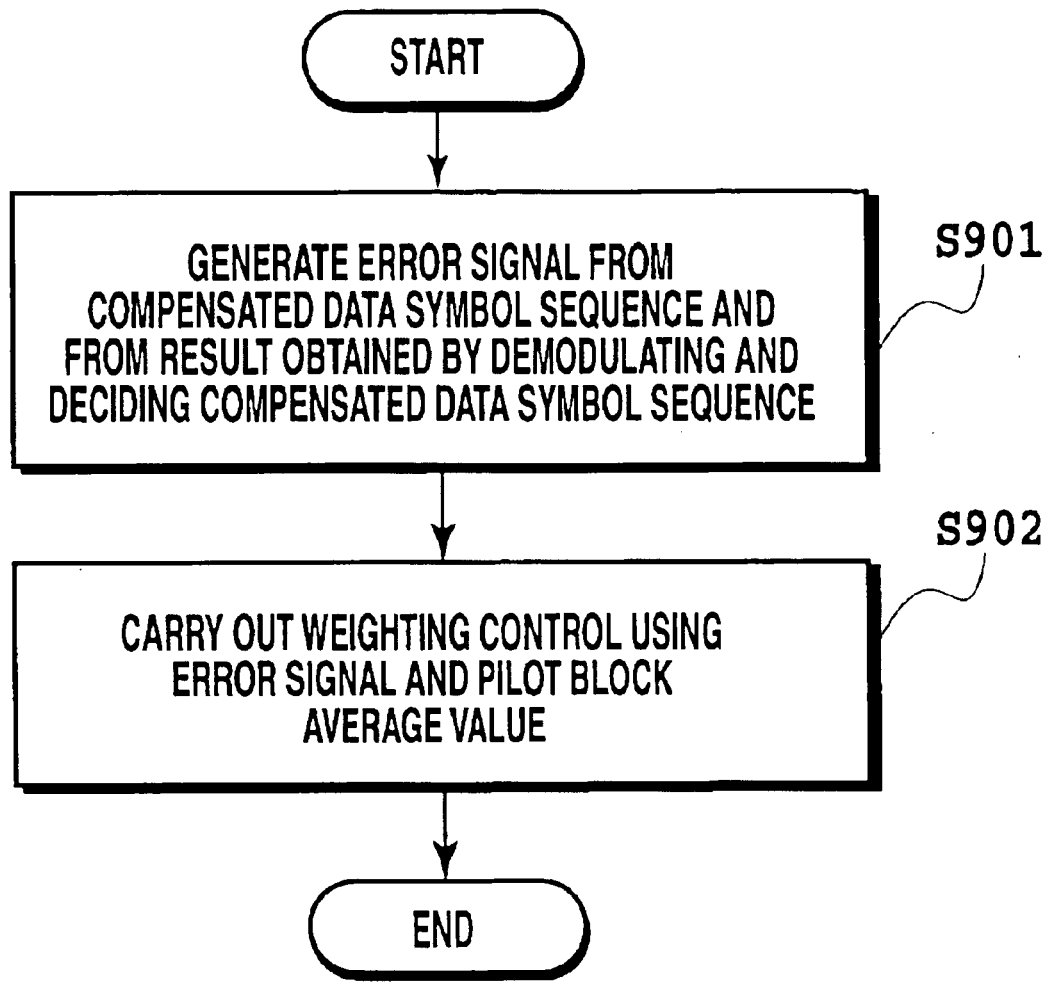
FIG. 9 is a flowchart illustrating a weighting control processing by the CDMA receiver of the third embodiment in accordance with the present invention.

FIG. 9 is a flowchart illustrating a weighting control processing by the CDMA receiver of the present embodiment. At step S901, the error signal generator 842 generates an error signal (identification error information) from the compensated data symbol sequence and from result obtained by demodulating and deciding the compensated data symbol sequence. The data decision is carried out by the data decision section 846 that makes a decision (0/1) of the output of the RAKE combiner 832.

At step S902, the weighting controller (MMSE) 844 carries out the control of weighting (weighting factors $\alpha_{m,i}$) using the error signal and the pilot block average values (the channel estimation values obtained from the individual pilot blocks) $\bar{\xi}$ as the feedback information.

Thus adaptively optimizing the weighting values for the pilot symbols in response to the channel fluctuation rate makes it possible to improve the resistance to fading fluctuations, and to carry out the highly accurate channel estimation.

Furthermore, since the weighting factors can be updated not at the pilot symbol intervals (slot intervals) but at the symbol intervals in the present embodiment, the convergence capability of the weighting factors can be improved.

Incidentally, a CDMA transceiver can be arranged by employing the CDMA receiver 800 of the third embodiment in accordance with the present invention as the receiving processor, and the transmitting processor 510 of the CDMA transceiver 500 of the second embodiment in accordance with the present invention as the transmitting processor.

[Fourth Embodiment]

Figure 10:
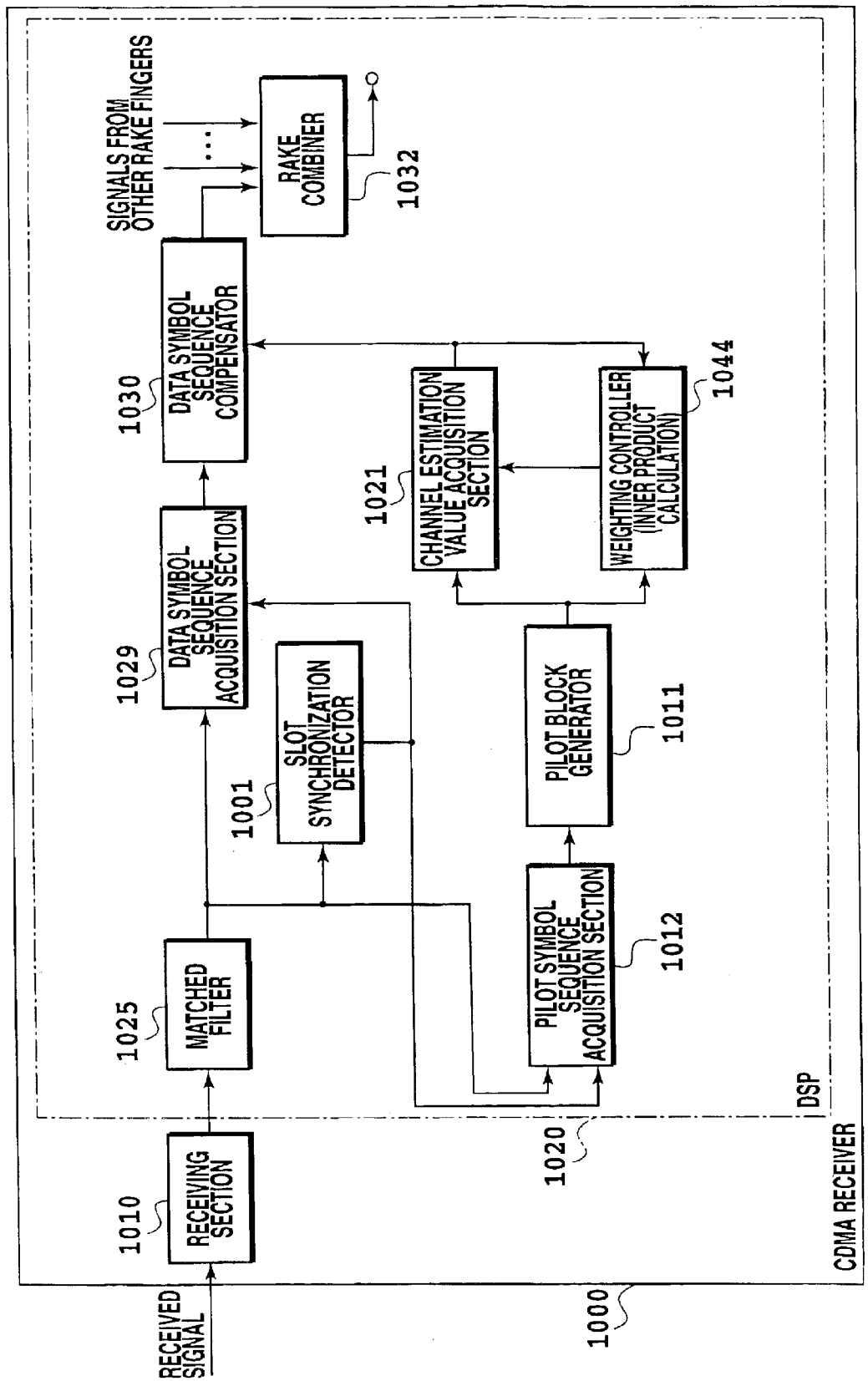
FIG. 10 is a block diagram showing a configuration of the CDMA receiver of a fourth embodiment in accordance with the present invention.

FIG. 10 is a block diagram showing a CDMA receiver of a fourth embodiment in accordance with the present invention. The CDMA receiver 1000 of the present embodiment receives and demodulates a signal including a combined symbol sequence that has a plurality of slots and includes both data symbols and pilot symbols.

The CDMA receiver 1000 comprises a receiving section 1010, a matched filter 1025, a slot synchronization detector 1001, a pilot symbol sequence acquisition section 1012, a pilot block generator 1011, a channel estimation value acquisition section 1021, a data symbol sequence acquisition section 1029, a data symbol sequence compensator 1030, a RAKE combiner 1032, and a weighting controller (inner product calculator) 1044. Although in the present embodiment, the matched filter 1025, slot synchronization detector 1001 and the like are implemented by software using a DSP (plus a memory for storing programs) 1020 as shown in FIG. 10, they can be implemented by means of hardware. The configurations and functions of the receiving section 1010, matched filter 1025 and the like are the same as those of their counterparts of the CDMA receiver 100 of the first embodiment in accordance with the present invention. Besides, the CDMA receiver 1000 of the present embodiment carries out the same processing as the receiving processing (FIGS. 2A and 2B) of the CDMA receiver 100 of the first embodiment in accordance with the present invention, except that it is unnecessary for the CDMA receiver 1000 of the present embodiment to obtain the channel estimation values of the pilot symbols.

Figure 11:
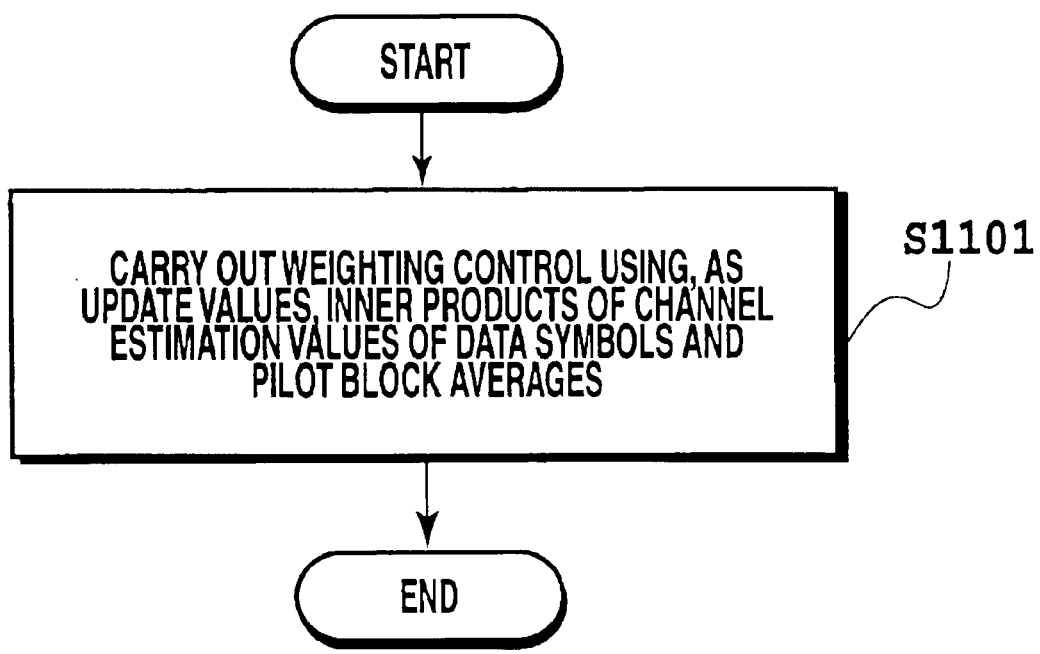
FIG. 11 is a flowchart illustrating a weighting control processing by the CDMA receiver of the fourth embodiment in accordance with the present invention.

FIG. 11 is a flowchart illustrating a weighting control processing by the CDMA receiver of present embodiment. At step S1101, the weighting controller (inner calculation) 1044 carries out the control (updating) of the weighting (weighting factors $\alpha_{m,i}$) as the following equation (2), using the inner products (correlation values) of the channel estimation values $\tilde{\xi}$ of the data symbols and the pilot block average values (channel estimation values obtained from the individual pilot blocks) $\overline{\tilde{\xi}}$ as the update values (feedback information).

$$A_m(n) = A_m(n-1) + \mu \tilde{\xi}_m(n) \overline{\tilde{X}}(n) \quad (2)$$

$$A_m(n) = \begin{pmatrix} \alpha_{m,-K+1}(n) \\ \alpha_{m,-K+2}(n) \\ \vdots \\ \alpha_{m,K-1}(n) \\ \alpha_{m,K}(n) \end{pmatrix}, \overline{\tilde{X}}(n) = \begin{pmatrix} \overline{\tilde{\xi}}(n-K+1) \\ \overline{\tilde{\xi}}(n-K+2) \\ \vdots \\ \overline{\tilde{\xi}}(n+K-1) \\ \overline{\tilde{\xi}}(n+K) \end{pmatrix}$$

$$\tilde{\xi}_m(n) = A_m^t(n-1) \cdot \overline{\tilde{X}}(n)$$

where, $A_m(n)$ is the weighting factor of the m-th data symbol in the n-th slot, $\mu$ is a step size of the updating, $\overline{\tilde{\xi}}$ (n+i) is the pilot block average value of the (n+i)-th slot, and $\tilde{\xi}_m(n)$ is the channel estimation value of the m-th data symbol in the n-th slot. In addition, $A_m^t(n)$ denotes the transpose of $A_m(n)$.

Thus adaptively optimizing the weighting values for the pilot symbols in response to the channel fluctuation rate makes it possible to improve the resistance to fading fluctuations, and to carry out the highly accurate channel estimation.

Furthermore, it is unnecessary for the present embodiment to demodulate the data or to generate the error signal, which makes it possible to carry out the weighting control in response to the channel fluctuations with a simple configuration.

Incidentally, a CDMA transceiver can be configured by employing the CDMA receiver 1000 of the fourth embodiment in accordance with the present invention as the receiving processor, and the transmitting processor 510 of the CDMA transceiver 500 of the second embodiment in accordance with the present invention as the transmitting processor.

[Fifth Embodiment]

Figure 12:
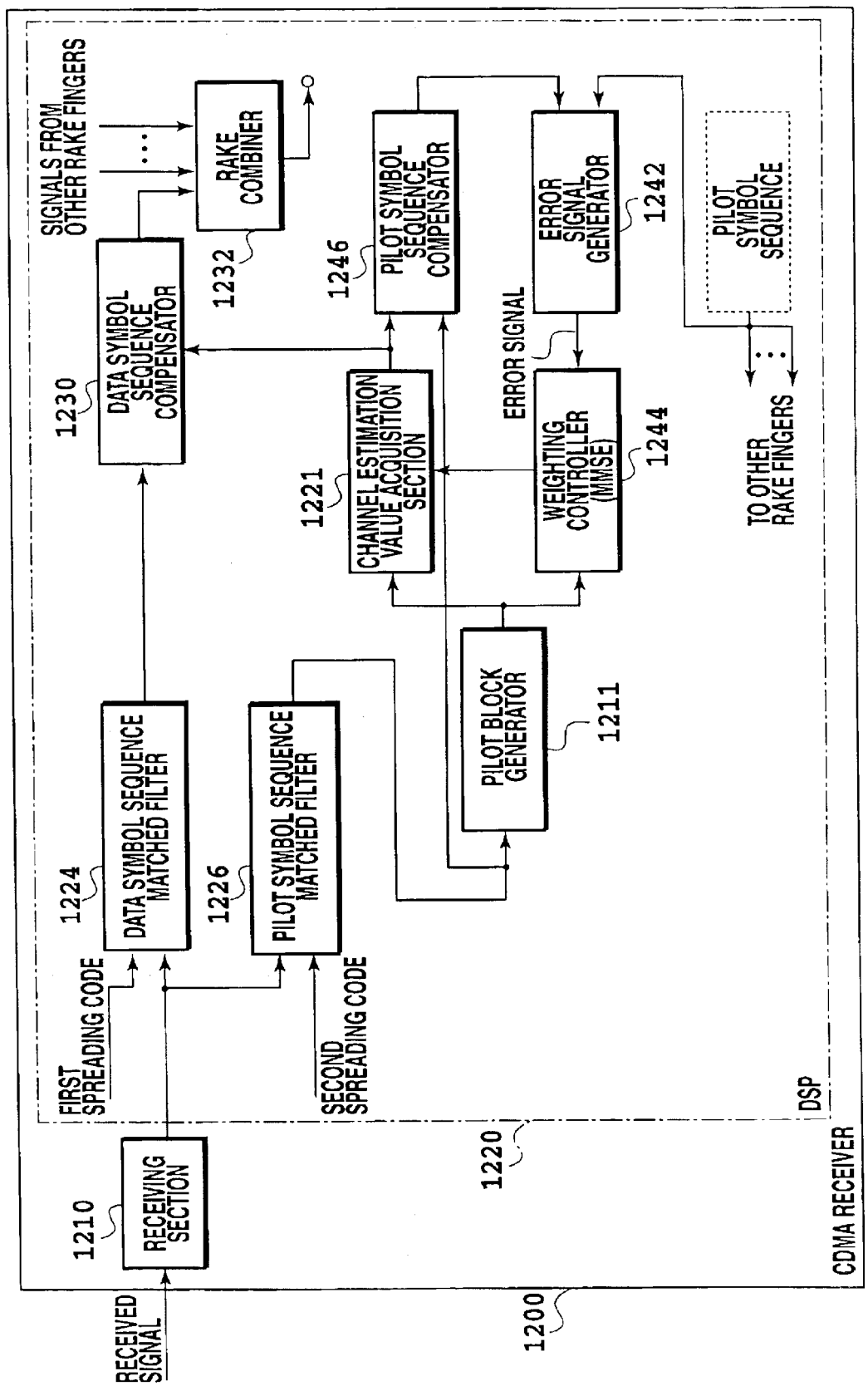
FIG. 12 is a block diagram showing a configuration of the CDMA receiver of a fifth embodiment in accordance with the present invention.

FIG. 12 is a block diagram showing a configuration of a CDMA receiver of the fifth embodiment in accordance with the present invention. The CDMA receiver 1200 of the present embodiment receives and demodulates a signal including a data symbol sequence and a pilot symbol sequence parallel to the data symbol sequence.

The CDMA receiver 1200 comprises a receiving section 1210, a data symbol sequence matched filter 1224, a pilot symbol sequence matched filter 1226, a pilot block generator 1211, a channel estimation value acquisition section 1221, a data symbol sequence compensator 1230, a RAKE combiner 1232, an error signal generator 1242, and a weighting controller (MMSE) 1244.

Although in the present embodiment, the data symbol sequence matched filter 1224, pilot symbol sequence matched filter 1226 and the like are implemented by software using a DSP (plus a memory for storing programs) 1220 as shown in FIG. 12, they can also be implemented by means of hardware.

Figure 13B:
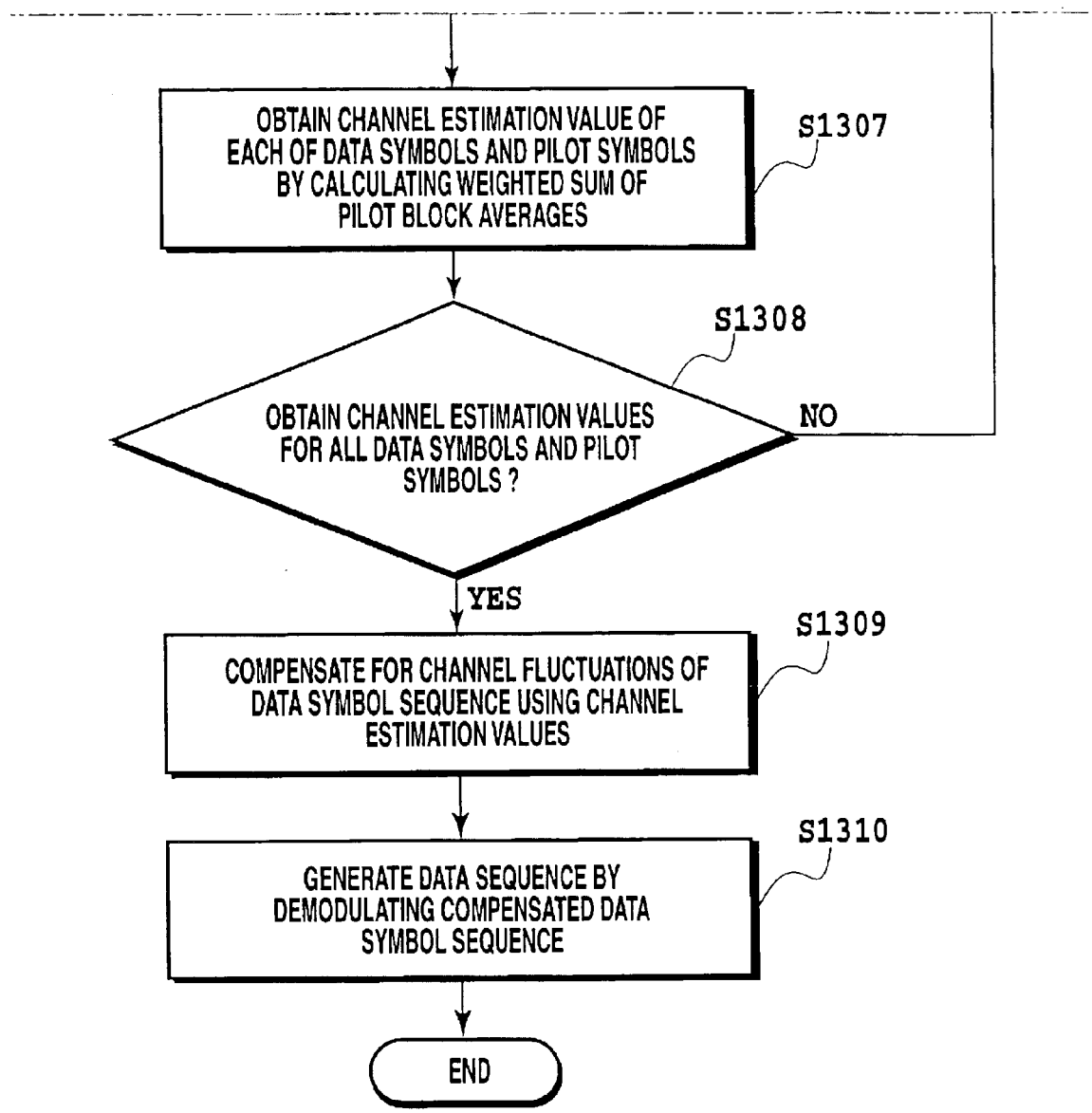
FIG. 13B is a flowchart illustrating the receiving processing by the CDMA receiver of the fifth embodiment in accordance with the present invention.

FIGS. 13A and 13B are flowcharts illustrating a receiving processing by the CDMA receiver of the present embodiment. First, at step S1301, the receiving section 1210 receives a received signal, that is, a spread data symbol sequence and a spread pilot symbol sequence.

In the present embodiment, it is assumed that the data symbol sequence and the pilot symbol sequence are spread by a first spreading code and a second spreading code, respectively, which are orthogonal to each other. However, it is also possible to receive such data symbol sequence and pilot symbol sequence that are spread by a first spreading code and a second spreading code that are not orthogonal to each other.

In addition, it is assumed in the present embodiment that the spread data symbol sequence and the spread pilot symbol sequence are impressed (transmitted) on a first carrier and a second carrier, respectively, which are orthogonal to each other. However, it is also possible to receive such data symbol sequence and pilot symbol sequence that are impressed on a first carrier and a second carrier that are not orthogonal to each other. As a typical example of the carriers that are orthogonal to each other, there are sine waves and cosine waves.

At step S1302, the data symbol sequence matched filter 1224 generates the data symbol sequence by despreading the received signal using the first spreading code. At step S1303, the pilot symbol sequence matched filter 1226 generates the pilot symbol sequence by despreading the received signal using the second spreading code. Subsequently, through steps S1304–S1308, the pilot block generator 1211 and channel estimation value acquisition section 1221 carry out the channel estimation, thereby obtaining the channel estimation values of the data symbols and pilot symbols.

Figure 14:
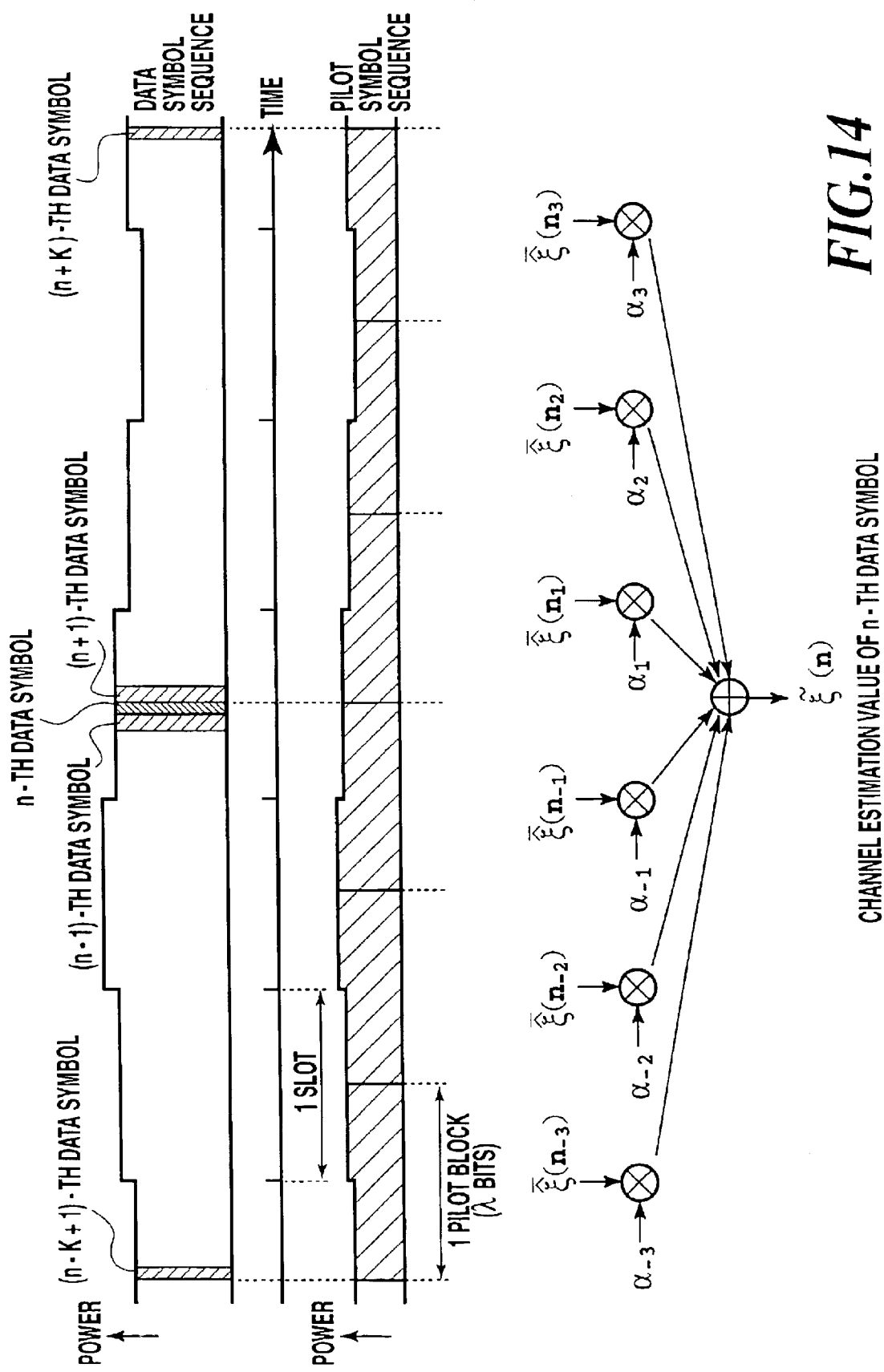
FIG. 14 is a diagram illustrating the operation principle of the channel estimation by the CDMA receiver of the fifth embodiment in accordance with the present invention, taking an example of channel estimation.

FIG. 14 is a diagram illustrating the operation principle of the channel estimation by the channel estimation unit of the present embodiment, taking an example of obtaining the channel estimation value of the n-th data symbol, where n is an integer. In the example as shown in FIG. 14, the power of the pilot symbol sequence is made less than that of the data symbol sequence to suppress the power loss. In addition, the data symbol sequence and pilot symbol sequence are subjected to the transmission power control at every slot interval.

Returning to FIG. 13A, the pilot block generator 1211 generates a plurality of pilot blocks from the pilot symbol sequence at step S1304. In the example as shown in FIG. 14, to generates L (three, in this example) pilot blocks of λ bits before and after the n-th pilot symbol, pilot symbols from (n−K+1)-th to (n+K)-th pilot symbol are used, where K is a natural number equal to L×λ.

It is preferable that the pilot blocks be formed from pilot symbols belonging to many different slots to use these pilot symbols for the channel estimation. This is because although the pilot symbols belonging to different slots have different power, the effect of reduction in thermal noise and interfering signals by using pilot symbols in more slots is greater than the channel estimation error caused by the power difference, and this enables more highly accurate channel estimation. In the example as shown in FIG. 14, six pilot blocks are generated from pilot symbols belonging to seven different slots.

It is not necessary, when obtaining the channel estimation value of the n-th data symbol, to generate the same number of pilot blocks before and after the n-th pilot symbol as in the example of FIG. 3. Thus, the pilot block can also be generated only from the pilot symbols with the number less than (previous to) the n-th pilot symbol, considering the delay of the channel estimation.

The length of the pilot block can be determined regardless of the length of the slot. In addition, the length of the pilot block can be set equal to the length of the pilot symbol. In other words, the pilot block can consist of one pilot symbol. Furthermore, the length of the pilot block may be variable for each pilot block.

Through steps S1305–S1307, the channel estimation value acquisition section 1221 obtains the channel estimation values of the data symbols and pilot symbols. First, at step S1305, it obtains the pilot block average value $\bar{\xi}$ by averaging the pilot symbols $\hat{\xi}$ (estimated complex fading envelopes) contained in the pilot block. It repeats the processing for all the pilot blocks (step S1306). If the pilot block consists of a single pilot symbol, that pilot symbol $\hat{\xi}$ itself becomes the pilot block average value $\bar{\xi}$. In the example of FIG. 14, the pilot block average values $\bar{\xi}(n_i)$ are obtained for respective i-th pilot blocks, where i varies from −L to L and i≠0.

At step S1307, the channel estimation value $\tilde{\xi}$ of the data symbol or pilot symbol is obtained by calculating the weighted sum of the pilot block average values $\bar{\xi}$. In the example of FIG. 14, the channel estimation value $\tilde{\xi}(n)$ of the n-th data symbol is obtained by setting the weighting factors of the i-th pilot blocks as $\alpha_i$.

In addition, in the present embodiment, the channel estimation values are also obtained for the pilot symbols to carry out the weighting control. As the channel estimation value of the n-th pilot symbol, the channel estimation value $\tilde{\xi}(n)$ of the n-th data symbol values can be used without any change.

The channel estimation value $\tilde{\xi}(n)$ is given by the following equation (3).

$$\tilde{\xi}(n) = \sum_{i=-L, i \neq 0}^{L} \alpha_i \cdot \bar{\xi}(n_i) \qquad (3)$$

The foregoing steps S1304–S1307 are repeated for all data symbols and pilot symbols with which the channel estimation values are to be obtained (step S1308).

After obtaining the channel estimation values, the data symbol sequence compensator 1230 compensates for the channel fluctuations of the data symbol sequence at step S1309 using the channel estimation values $\tilde{\xi}$ (of the data symbols). More specifically, it compensates for the channel fluctuations of the data symbols by multiplying the data symbol sequence by the complex conjugates of the channel estimation values $\tilde{\xi}$.

At step S1310, the RAKE combiner 1232 carries out the coherent combining of the compensated data symbol sequences supplied from the RAKE fingers.

The CDMA receiver 1200 of the present embodiment carries out the same processing as the weighting control processing (FIG. 4) by the CDMA receiver 100 in the first embodiment in accordance with the present invention. In other words, the pilot symbol sequence compensator 1246 compensates for the channel fluctuations of the pilot symbol sequence at step S401 using the channel estimation values $\tilde{\xi}$ (of the pilot symbols).

At step S402, the error signal generator 1242 generates an error signal (identification error information) from the compensated pilot symbol sequence and the ideal pilot symbol sequence (which is not affected by the channel fluctuations). The ideal pilot symbol sequence is known, and is prepared in the receiver 1200 in advance.

At step S403, the weighting controller (MMSE) 1244 carries out the control of the weighting (weighting factors $\alpha_i$) using the error signal and the pilot block average values (channel estimation values obtained from the individual pilot blocks) $\bar{\xi}$ as the feedback information.

Thus adaptively optimizing the weighting values for the pilot symbols in response to the channel fluctuation rate makes it possible to improve the resistance to fading fluctuations, and to carry out the highly accurate channel estimation.

[Sixth Embodiment]

Figure 15:
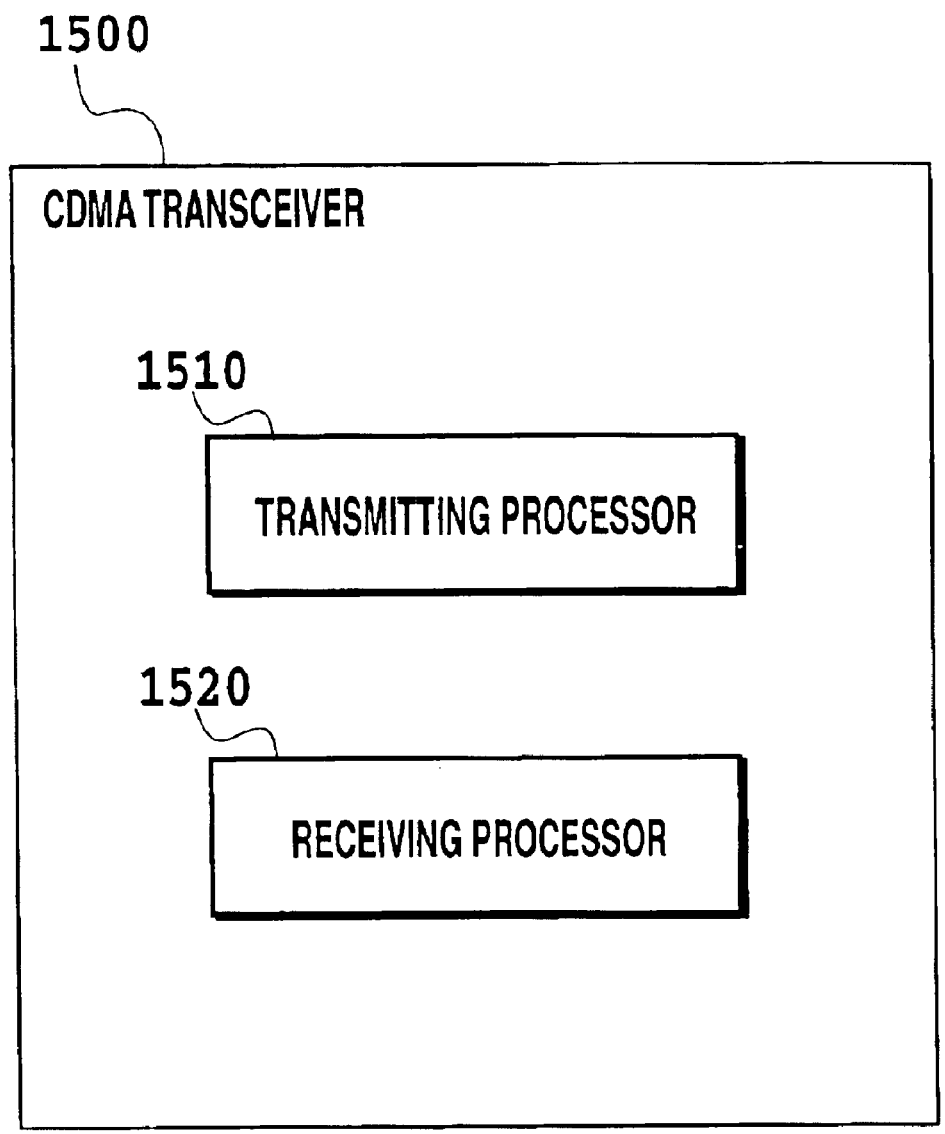
FIG. 15 is a block diagram showing a configuration of a CDMA transceiver of a sixth embodiment in accordance with the present invention.

FIG. 15 is a block diagram showing a configuration of the CDMA transceiver of a sixth embodiment in accordance with the present invention. The CDMA transceiver 1500 of the present embodiment transmits a signal including a data symbol sequence and a pilot symbol sequence parallel to the data symbol sequence, and receives and demodulates such a signal.

The CDMA transceiver 1500 comprises a transmitting processor 1510 and a receiving processor 1520. The configuration of the receiving processor 1520 and its receiving processing and weighting control processing are the same as the configuration (see, FIG. 12), the receiving processing (see, FIGS. 13A and 13B) and weighting control processing (see, FIG. 4) of the CDMA receiver 1200 of the fifth embodiment in accordance with the present invention.

Figure 16:
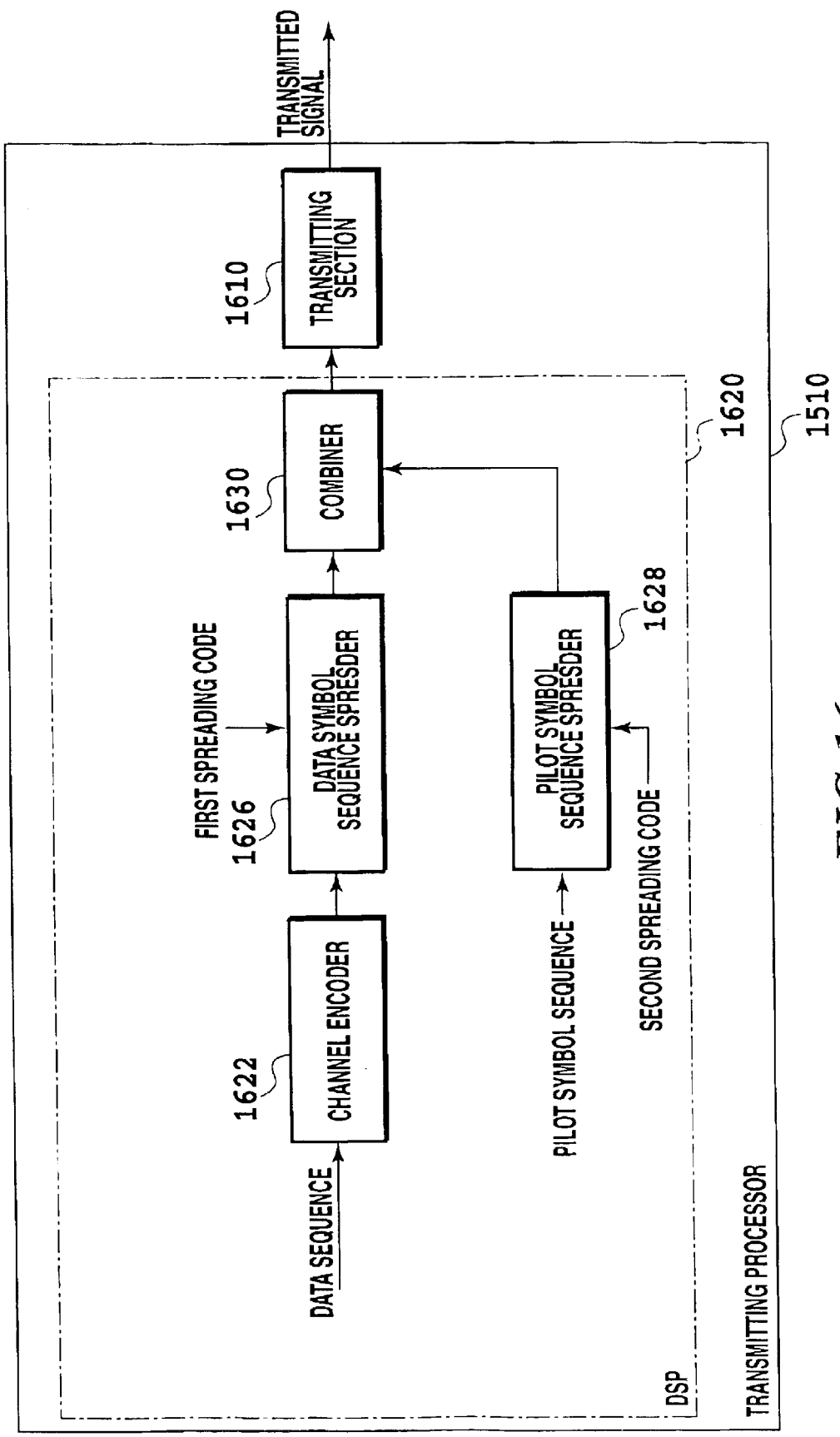
FIG. 16 is a block diagram showing a configuration of a transmission processor of the CDMA transceiver in the sixth embodiment in accordance with the present invention.

FIG. 16 is a block diagram showing a configuration of the transmitting processor of the CDMA transceiver of the present embodiment. As shown in FIG. 16, the transmitting processor 1510 comprises a transmitting section 1610, a channel encoder 1622, a data symbol sequence spreader 1626, a pilot symbol sequence spreader 1628, and a combiner 1630. Although in the present embodiment, the channel encoder 1622, data symbol sequence spreader 1626 and the like are implemented by software using a DSP (plus a memory for storing programs) 1620, they can be implemented by means of hardware.

Figure 17:
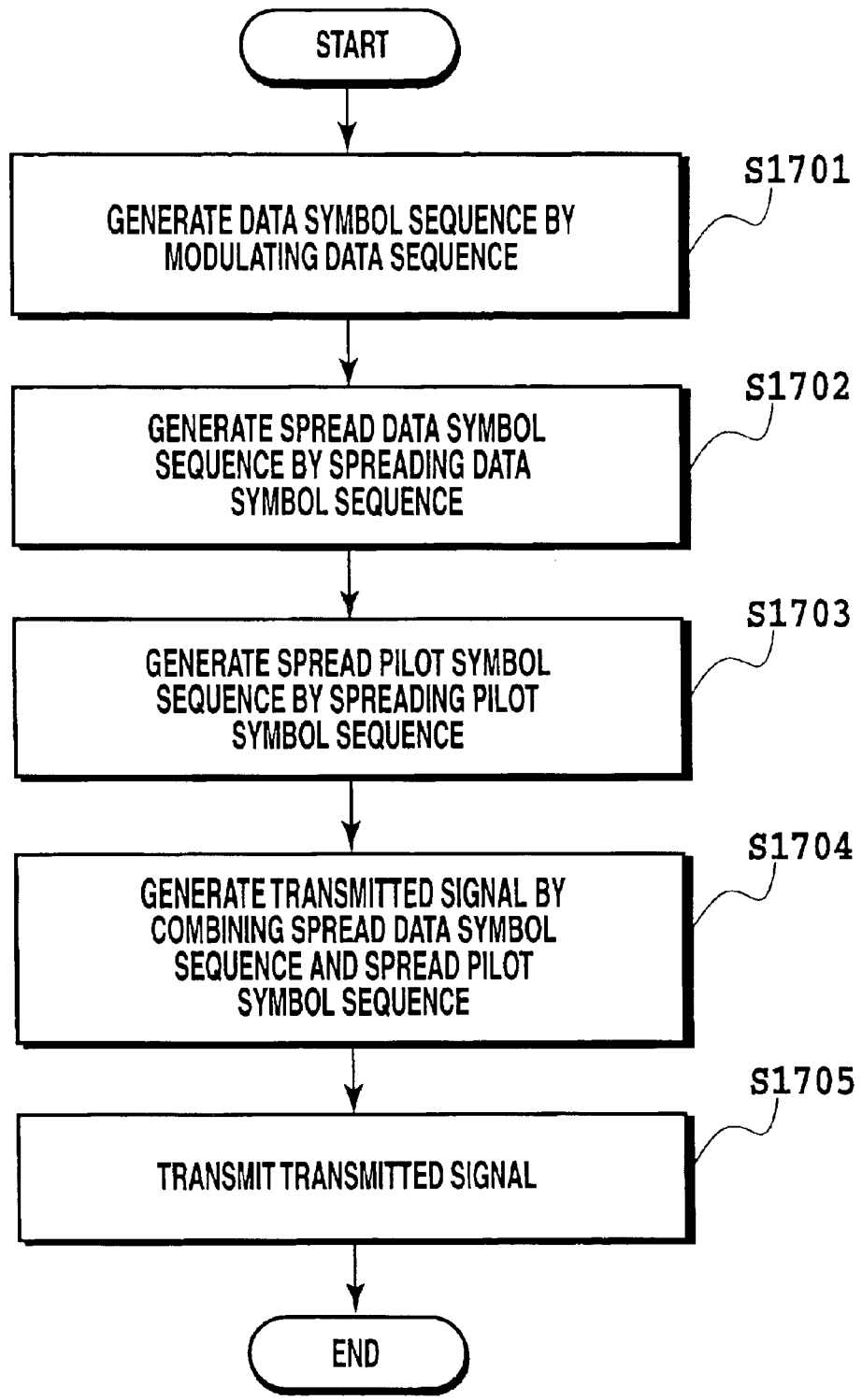
FIG. 17 is a flowchart illustrating a transmission processing by the transmission processor of the CDMA transceiver in the sixth embodiment in accordance with the present invention.

FIG. 17 is a flowchart illustrating a transmission processing by the transmitting processor of the CDMA transceiver of the present embodiment. First, at step S1701, the channel encoder 1622 generates a data symbol sequence by modulating (encoding) a data sequence. At step S1702, the data symbol sequence spreader 1626 generates a spread data symbol sequence by spreading the data symbol sequence using a first spreading code. At step S1703, the pilot symbol sequence spreader 1628 generates a spread pilot symbol sequence by spreading the pilot symbol sequence using a second spreading code. At step S1704, the combiner 1630 combines the spread data symbol sequence and the spread pilot symbol sequence, thereby generating a transmitted signal. At step S1705, the transmitting section 1610 transmits the transmitted signal.

The present embodiment employs the first spreading code and second spreading code which are orthogonal to each other. However, the first and second spreading codes can be used which are not orthogonal to each other.

In addition, the present embodiment combines a first carrier and a second carrier which are orthogonal to each other after impressing the spread data symbol sequence and the spread pilot symbol sequence on the carries, and transmits the combined carrier. However, first and second carriers which are not orthogonal to each other can be combined after impressing the spread data symbol sequence and spread pilot symbol sequence thereon, so as to be transmitted as the combined carrier.

[Seventh Embodiment]

Figure 18:
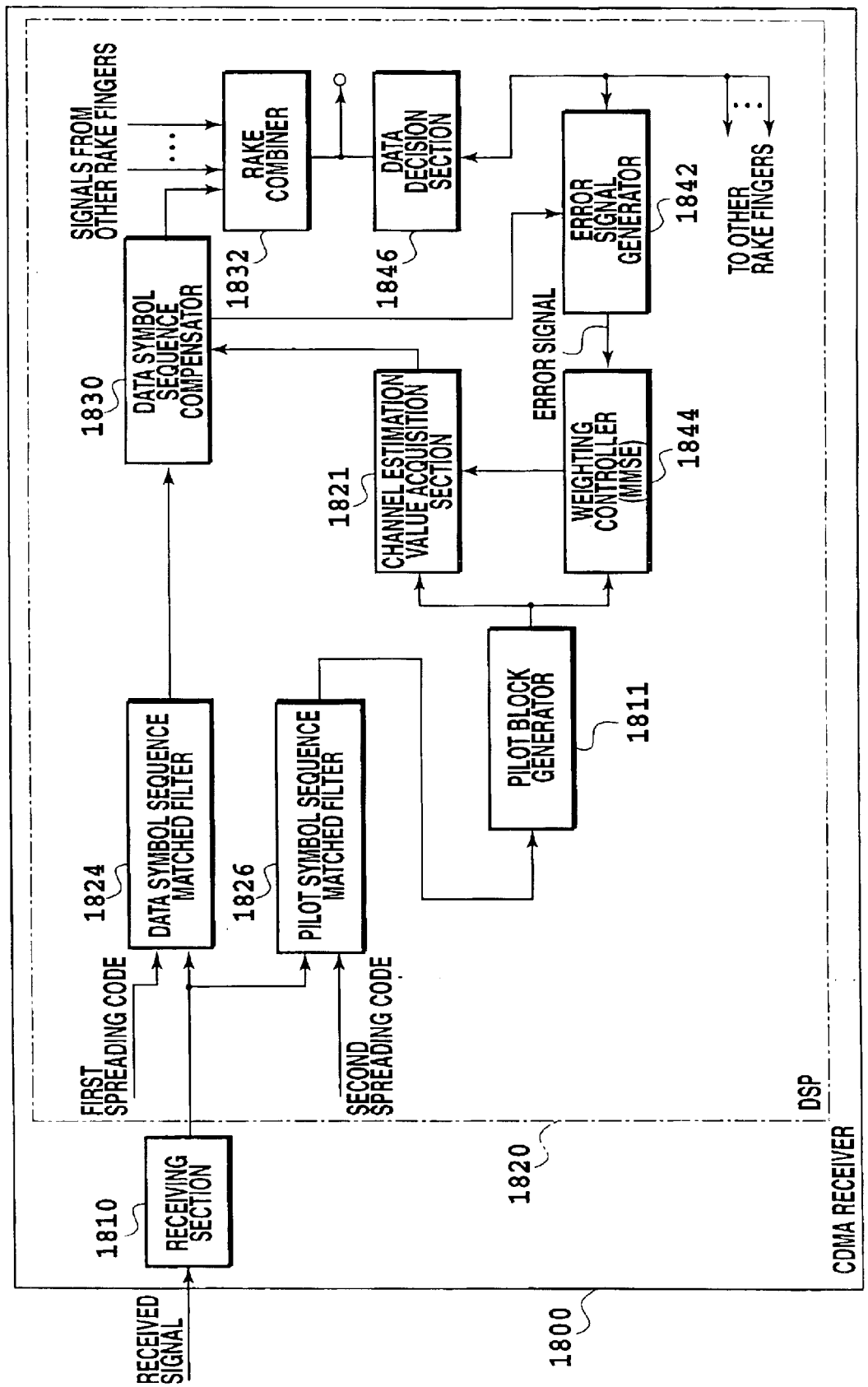
FIG. 18 is a block diagram showing a configuration of the CDMA receiver of a seventh embodiment in accordance with the present invention.

FIG. 18 is a block diagram showing a configuration of the CDMA receiver of a seventh embodiment in accordance with the present invention. The CDMA receiver 1800 of the present embodiment receives and demodulates a signal including a data symbol sequence and a pilot symbol sequence parallel to the data symbol sequence.

The CDMA receiver 1800 comprises a receiving section 1810, a data symbol sequence matched filter 1824, a pilot symbol sequence matched filter 1826, a pilot block generator 1811, a channel estimation value acquisition section 1821, a data symbol sequence compensator 1830, a RAKE combiner 1832, a data decision section 1846, an error signal generator 1842, and a weighting controller (MMSE) 1844. Although in the present embodiment, the data symbol sequence matched filter 1824, pilot symbol sequence matched filter 1826 and the like are implemented by software using a DSP (plus a memory for storing programs) 1820 as shown in FIG. 18, they can also be implemented by means of hardware. The receiving section 1810, data symbol sequence matched filter 1824 and the like have the same configurations and functions as those of their counterparts of the CDMA receiver 1200 of the fifth embodiment in accordance with the present invention. In addition, the CDMA receiver 1800 of the present embodiment carries out the same processing as the receiving processing of the CDMA receiver 1200 (see, FIGS. 13A and 13B) of the fifth embodiment in accordance with the present invention, except that it is unnecessary for the present embodiment to obtain the channel estimation values of the pilot symbols.

Furthermore, the CDMA receiver 1800 of the present embodiment carries out the same processing as the weighting control processing of the CDMA receiver 800 (see, FIG. 9) of the third embodiment in accordance with the present invention. Specifically, at step S901, the error signal generator 1842 generates an error signal (identification error information) from the compensated data symbol sequence and from the result obtained by demodulating and deciding the compensated data symbol sequence. The data decision is carried out by the data decision section 1846 that makes a decision (0/1) of the output of the RAKE combiner 1832.

At step S902, the weighting controller (MMSE) 1844 carries out the control of the weighting (weighting factors $\alpha_i$) using the error signal and pilot block average values (channel estimation values obtained from the individual pilot blocks) $\bar{\xi}$ as the feedback information.

Thus adaptively optimizing the weighting values for the pilot symbols in response to the channel fluctuation rate makes it possible to improve the resistance to fading fluctuations, and to carry out the highly accurate channel estimation.

Incidentally, a CDMA transceiver can be arranged by employing the CDMA receiver 1800 of the seventh embodiment in accordance with the present invention as the receiving processor, and the transmitting processor 1510 of the CDMA transceiver 1500 of the sixth embodiment in accordance with the present invention as the transmitting processor.

[Eighth Embodiment]

Figure 19:
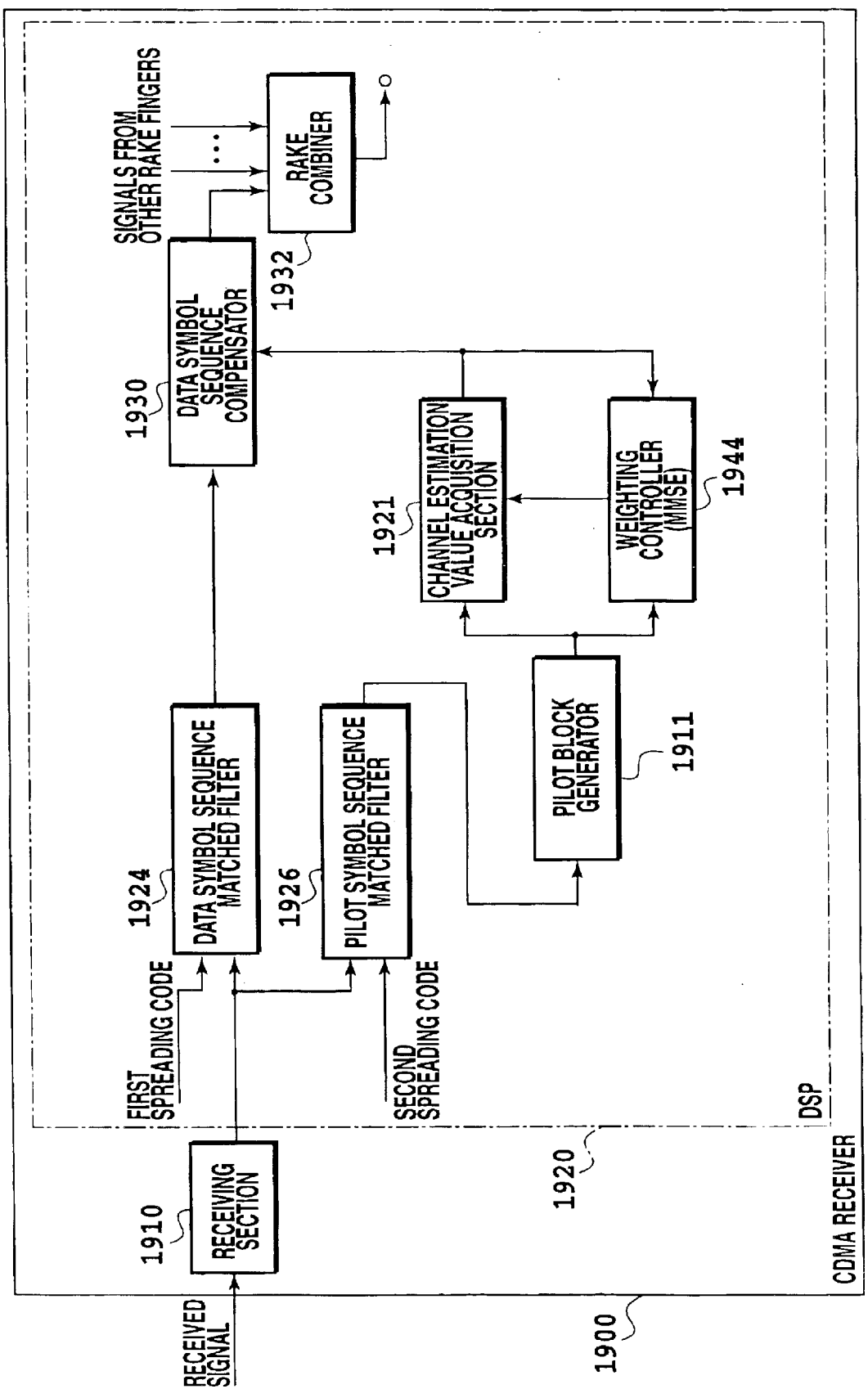
FIG. 19 is a block diagram showing a configuration of the CDMA receiver of an eighth embodiment in accordance with the present invention.

FIG. 19 is a block diagram showing a configuration of a CDMA receiver of an eighth embodiment in accordance with the present invention. The CDMA receiver 1900 of the present embodiment receives and demodulates a data symbol sequence and a pilot symbol sequence parallel to the data symbol sequence.

The CDMA receiver 1900 comprises a receiving section 1910, a data symbol sequence matched filter 1924, a pilot symbol sequence matched filter 1926, a pilot block generator 1911, a channel estimation value acquisition section 1921, a data symbol sequence compensator 1930, a RAKE combiner 1932, and a weighting controller (inner product calculation) 1944. Although in the present embodiment, the data symbol sequence matched filter 1924, pilot symbol sequence matched filter 1926 and the like are implemented by software using a DSP (plus a memory for storing programs) 1920 as shown in FIG. 19, they can be implemented by means of hardware. The receiving section 1910, data symbol sequence matched filter 1924 and the like have the same configurations and functions as their counterparts of the CDMA receiver 1200 of the fifth embodiment in accordance with the present invention. Besides, the CDMA receiver 1900 of the present embodiment carries out the same receiving processing as the CDMA receiver 1200 (see, FIGS. 13A and 13B) of the fifth embodiment in accordance with the present invention, except that it is unnecessary for the present embodiment to obtain the channel estimation values of the pilot symbols.

Furthermore, the CDMA receiver 1900 of the present embodiment carries out the same weighting control processing as the CDMA receiver 1000 (see, FIG. 11) of the fourth embodiment in accordance with the present invention. Specifically, at step S1101, the weighting controller (inner product calculation) 1944 carries out the control (updating) of the weighting (weighting factors $\alpha_i$) using the inner products (correlation values) of the channel estimation values $\bar{\xi}$ of the data symbols values and the pilot block average values (channel estimation values obtained from individual pilot blocks) $\bar{\xi}$ as the updating values (feedback information) as expressed by the following equation (4).

$$A(n) = A(n-1) + \mu \bar{\xi}(n) \bar{X}(n) \quad (4)$$

$$A_m(n) = \begin{pmatrix} \alpha_{-L}(n) \\ \vdots \\ \alpha_{-1}(n) \\ \alpha_1(n) \\ \vdots \\ \alpha_L(n) \end{pmatrix}, \bar{X}(n) = \begin{pmatrix} \bar{\xi}(n_{-L}) \\ \vdots \\ \bar{\xi}(n_{-1}) \\ \bar{\xi}(n_1) \\ \vdots \\ \bar{\xi}(n_L) \end{pmatrix}$$

$$\bar{\xi}(n) = A^t(n-1) \cdot \bar{X}(n)$$

where, A(n) is the weighting factor of the n-th data symbol, $\mu$ is a step size of the updating, $\bar{\xi}(n_i)$ is the pilot block average value of the i-th pilot block, and $\bar{\xi}(n)$ is the channel estimation value of the n-th data symbol. In addition, $A^t(n)$ denotes the transpose of A(n).

Thus adaptively optimizing the weighting values for the pilot symbols in response to the channel fluctuation rate makes it possible to improve the resistance to fading fluctuations, and to carry out the highly accurate channel estimation.

Furthermore, it is unnecessary for the present embodiment to demodulate the data or to generate the error signal, which makes it possible to carry out the weighting control in response to the channel fluctuations with a simple configuration.

Incidentally, a CDMA transceiver can be configured by employing the CDMA receiver 1900 of the eighth embodiment in accordance with the present invention as the receiving processor, and the transmitting processor 1510 of the CDMA transceiver 1500 of the sixth embodiment in accordance with the present invention as the transmitting processor.

[Supplements]

Figure 20:
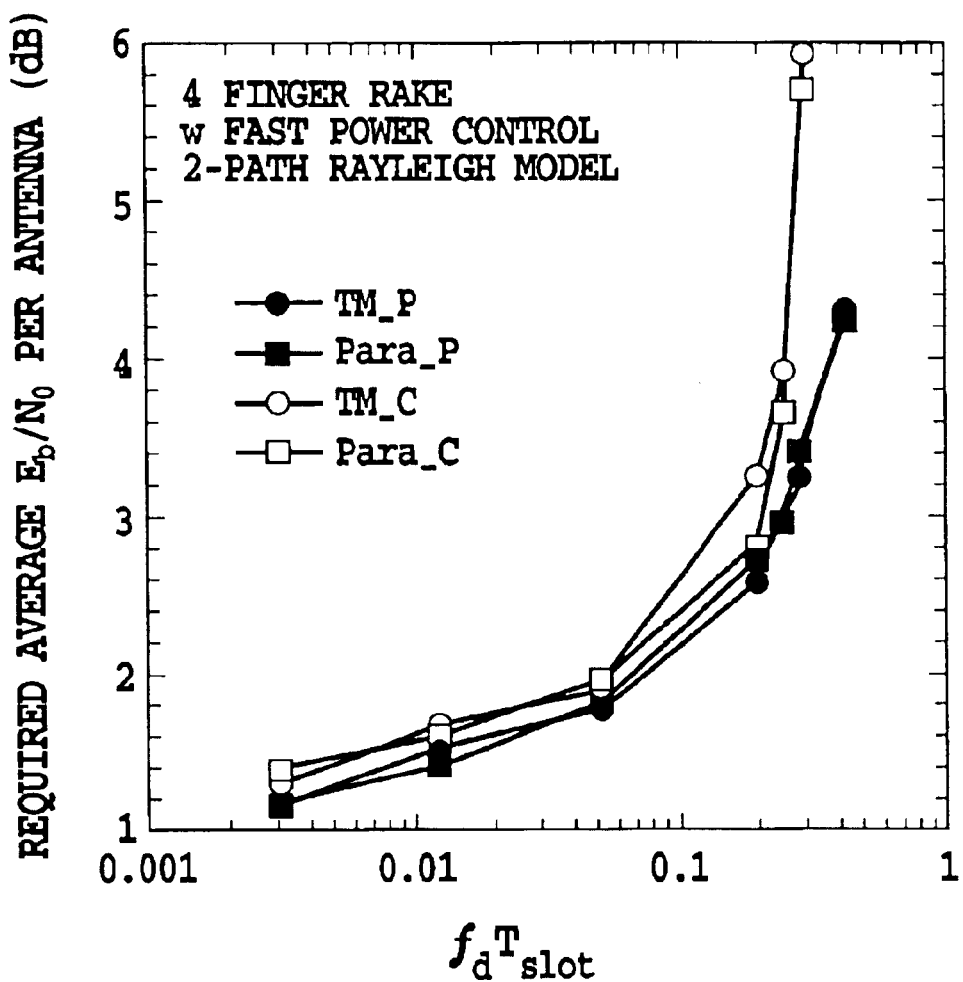
FIG. 20 is a diagram illustrating required error rate (BER=$10^{-3}$) characteristics for the product of a slot time ($T_{slot}$) and a maximum Doppler frequency ($f_d$) under a two-path Rayleigh model.
Figure 21:
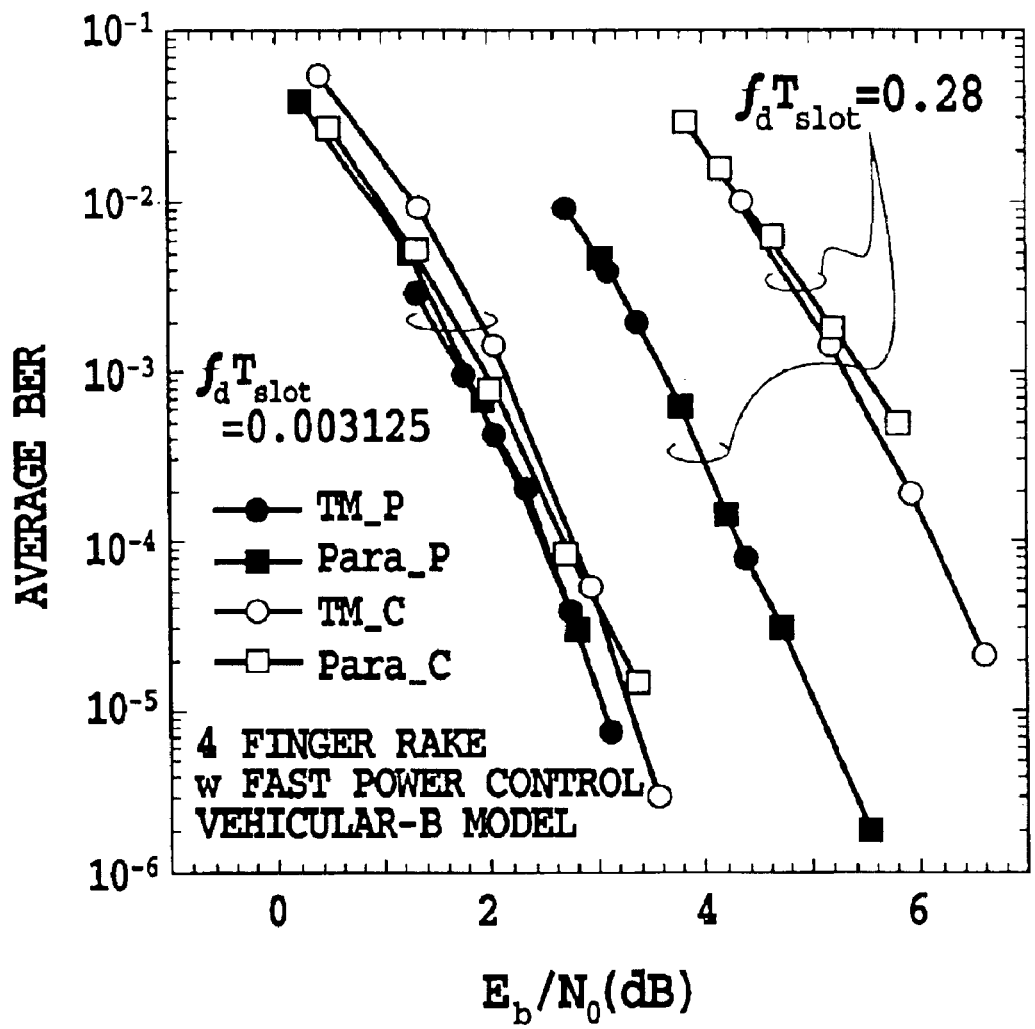
FIG. 21 is a diagram illustrating BER characteristics under a Vehicular-B environment when $f_d T_{slot}$=0.003125 and $f_d T_{slot}$=0.28.

FIG. 20 is a diagram illustrating characteristics of a required error rate (BER=$10^{-3}$) versus the product of a maximum Doppler frequency ($f_d$) and a slot time ($T_{slot}$) under a two-path Rayleigh model. FIG. 20 illustrates characteristics (TM_P) associated with the CDMA receiver of the fourth embodiment in accordance with the present invention (time multiplexed pilot channel method), characteristics (Para_) associated with the CDMA receiver of the eighth embodiment in accordance with the present invention (parallel pilot channel method), characteristics (TM_) associated with the conventional CDMA receiver with the fixed weighting factors (time multiplexed pilot channel method), and characteristics (Para_) associated with the conventional CDMA receiver with the fixed weighting factors (parallel pilot channel method FIG. 21 is a diagram illustrating BER characteristics under a Vehicular-B environment when $f_dT_{slot}$=0.003125 and $f_dT_{slot}$=0.28, and FIG. 22 is a diagram illustrating characteristics of a required error rate (BER=$10^{-3}$) versus $f_dT_{slot}$ under the Vehicular-B environment.

Figure 22:
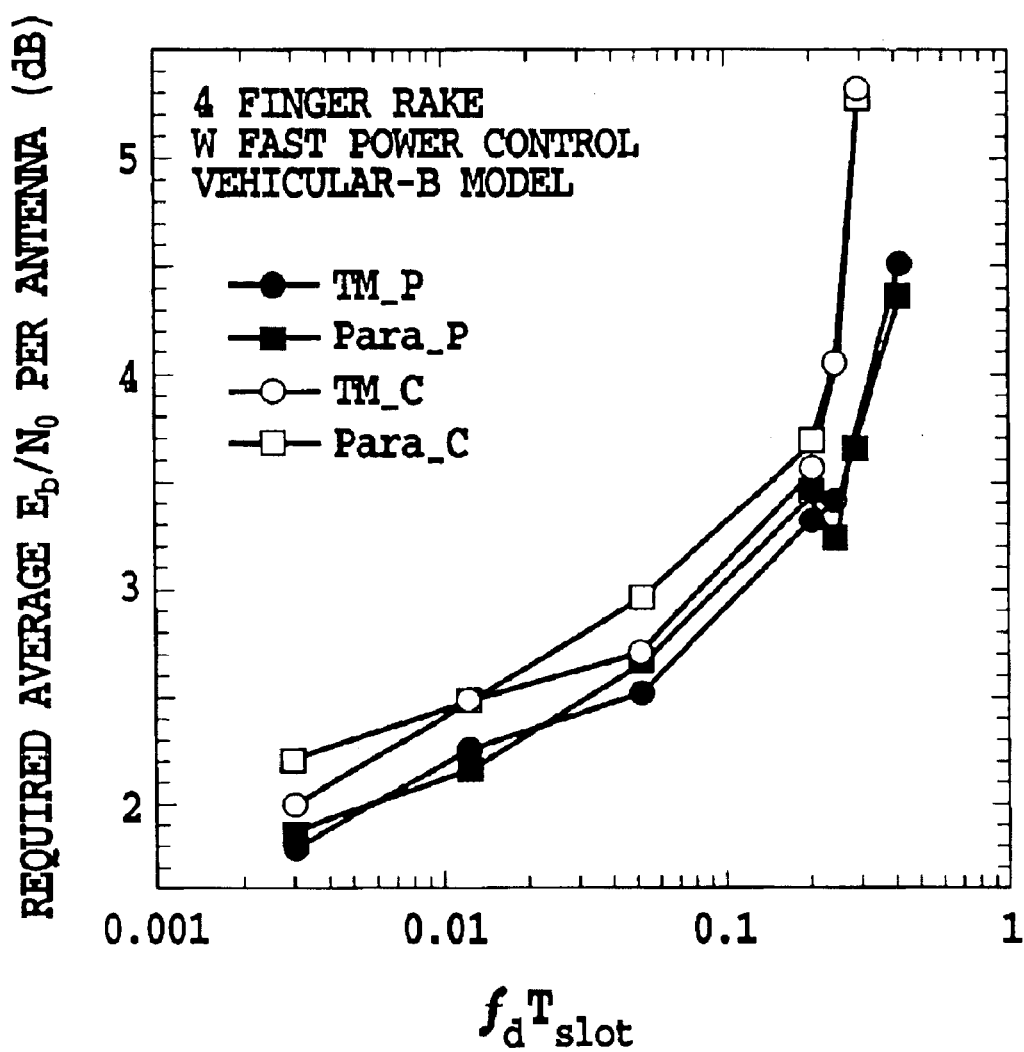
FIG. 22 is a diagram showing required error rate (BER=$10^{-3}$) characteristics for $f_d T_{slot}$ under a Vehicular-B environment.
Figure 23:
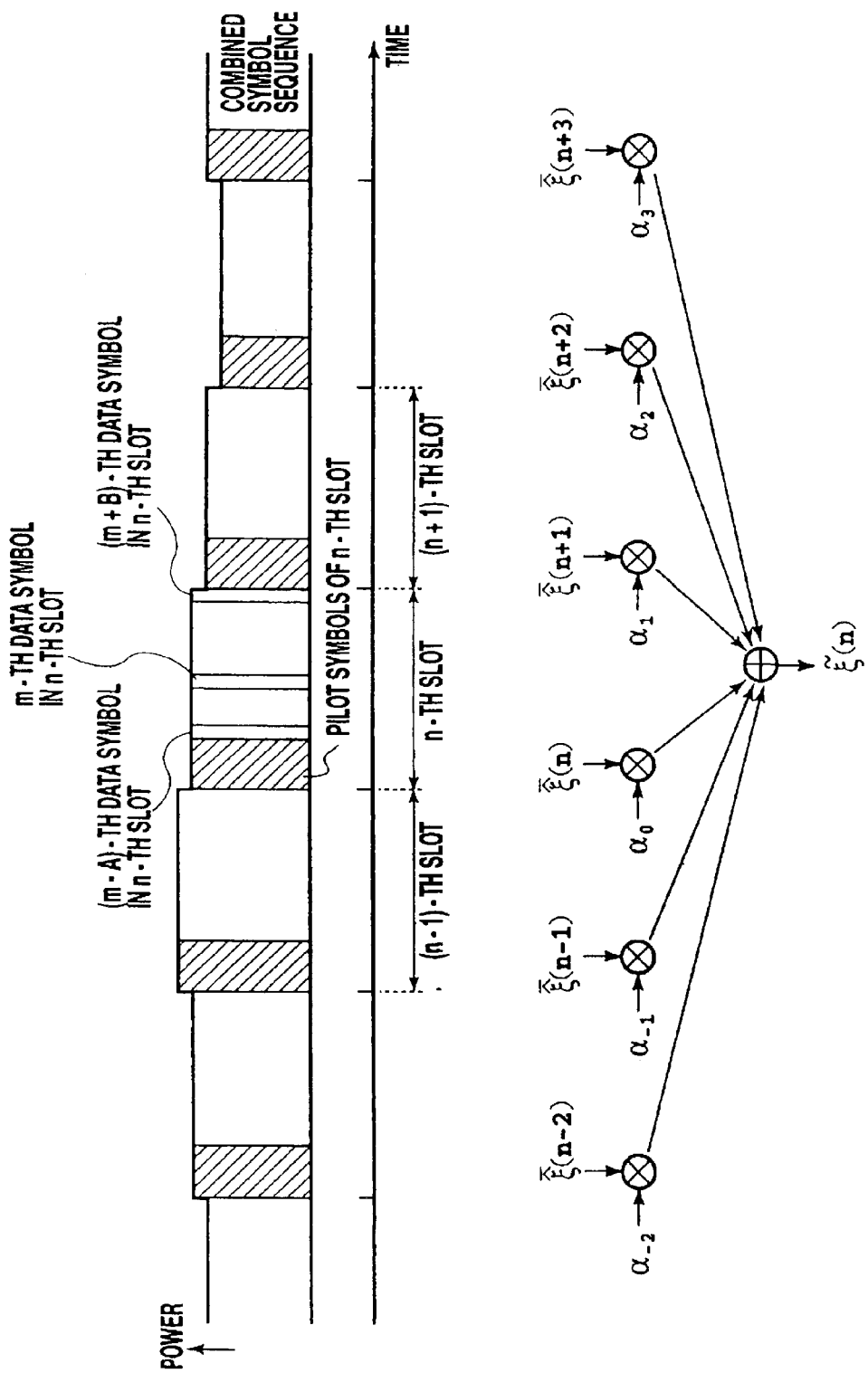
FIG. 23 is a diagram illustrating the operation principle of channel estimation in accordance with a related art.

It is found from FIGS. 20 and 22 that both the CDMA receivers of the fourth and eighth embodiments in accordance with the present invention have an improvement of about 0.2 dB under the two-path Rayleigh model and of about 0.4 dB under the Vehicular-B environment in a low rate fading as compared with the conventional CDMA receiver, and that the improvement increases with the fading rate in a high rate fading. Here, the improvement under the Vehicular-B environment is greater than that under the two-path Rayleigh model low rate fading because the present invention has a greater improvement when it can use more pilot symbols as in the Vehicular-B environment in which the effect of noise is greater during the low fading.

Furthermore, it is thought that the time multiplexed pilot channel method (the CDMA receiver of the fourth embodiment in accordance with the present invention) and the parallel pilot channel method (the CDMA receiver of the eighth embodiment in accordance with the present invention) have little difference over the entire range from the low rate to high rate fading. This is because in the low rate, the energy used for the estimation is equal, and the fading fluctuations are small, and because in the high rate, the effect characteristic of the time multiplexed pilot channel method that the signal energy is obtained in a short time is nearly comparable to the improvement of the parallel pilot channel method in the traceability to the high rating fading owing to a reduction in the number of synchronization additions of the parallel pilot channel method as compared with the time multiplexed pilot channel method.

As described above, the present invention can improve the resistance to fading fluctuations and carry out the highly accurate channel estimation by adaptively optimizing the weighting values for the pilot symbols in response to the rate of channel fluctuations.

Achieving the highly accurate channel estimation and the compensation for the channel fluctuations of the data symbols based on the estimation makes it possible to implement the absolute phase decision for each data symbol using the coherent detection even under the Rayleigh fading environment, for example, and hence to reduce the SNIR required for obtaining a required reception quality (received error rate). This can reduce the transmission power and increase the capacity of the system in terms of the number of users.

What is claimed is:

1. A receiver for receiving and demodulating a signal including a combined symbol sequence that has a plurality of slots and includes data symbols and pilot symbols, said receiver comprising:

means for detecting positions of the pilot symbols in the combined symbol sequence;

means for generating pilot blocks by extracting in a plurality of slots the pilot symbols from the combined symbol sequence in response to a result of the detection;

means for obtaining channel estimation values by calculating a weighted sum of average values of the pilot symbols in the pilot blocks;

means for acquiring from the combined symbol sequence a data symbol sequence in accordance with the result of the detection;

means for compensating for channel fluctuations of the data symbol sequence using the channel estimation values; and means for controlling the weighting in response to a rate of the channel fluctuations by using at least the pilot symbols included in the pilot blocks.

2. The receiver as claimed in claim 1, wherein said means for controlling the weighting comprises:

means for compensating for, using the channel estimation values, channel fluctuations of a pilot symbol sequence extracted from the combined symbol sequence;

means for generating an error signal from the compensated pilot symbol sequence and an ideal pilot symbol sequence; and means for carrying out the weighting control using the error signal and the average values of the pilot symbols included in the pilot blocks.

3. The receiver as claimed in claim 1, wherein said means for controlling the weighting comprises:

means for generating an error signal from the compensated data symbol sequence and from result obtained by demodulating and deciding the compensated data symbol sequence; and means for carrying out the weighting control using the error signal and the average values of the pilot symbols included in the pilot blocks.

4. The receiver as claimed in claim 1, wherein said means for controlling the weighting carries out the weighting control using as update values inner products of the channel estimation values of the data symbols and the average values of the pilot symbols included in the pilot blocks.

5. The receiver as claimed in claim 1, wherein said receiver receives a signal including a combined symbol sequence having a frame structure consisting of slots in which the pilot symbols consisting of a few symbols are inserted into the data symbol sequence at every fixed interval.

6. The receiver as claimed in claim 1, wherein the pilot blocks are formed from all the pilot symbols in a slot.

7. The receiver as claimed in claim 1, wherein when obtaining the channel estimation value of a data symbol in an n-th slot of the combined symbol sequence, where n is an integer, the pilot blocks are generated from an (n−K+1)-th slot to an (n+K)-th slot of the combined symbol sequence, where K is a natural number.

8. A receiver for receiving and demodulating a signal including a data symbol sequence and a pilot symbol sequence parallel to the data symbol sequence, said receiver comprising:

means for generating a plurality of pilot blocks from the pilot symbol sequence;

means for obtaining channel estimation values by calculating a weighted sum of average values of the pilot symbols in the pilot blocks;

means for compensating for channel fluctuations of the data symbol sequence using the channel estimation values; and means for controlling the weighting in response to a rate of the channel fluctuations by using at least the pilot symbols included in the pilot blocks.

9. The receiver as claimed in claim 8, wherein said means for controlling the weighting comprises:

means for compensating for, using the channel estimation values, channel fluctuations of the pilot symbol sequence;

means for generating an error signal from the compensated pilot symbol sequence and an ideal pilot symbol sequence; and means for carrying out the weighting control using the error signal and the average values of the pilot symbols included in the pilot blocks.

10. The receiver as claimed in claim 8, wherein said means for controlling the weighting comprises:

means for generating an error signal from the compensated data symbol sequence and from result obtained by demodulating and deciding the compensated data symbol sequence; and means for carrying out the weighting control using the error signal and the average values of the pilot symbols. included in the pilot blocks.

11. The receiver as claimed in claim 8, wherein said means for controlling the weighting carries out the weighting control using as update values inner products of the channel estimation values of the data symbols and the average values of the pilot symbols included in the pilot blocks.

12. The receiver as claimed in claim 8, wherein said receiver receives a signal including a data symbol sequence which is spread using a first spreading code, and a pilot symbol sequence which is parallel to the data symbol sequence and spread using a second spreading code, the first spreading code and the second spreading code being orthogonal to each other.

13. The receiver as claimed in claim 8, wherein said receiver receives a signal including a spread data symbol sequence which is impressed on a first carrier, and a spread pilot symbol sequence which is parallel to the data symbol sequence and is impressed on a second carrier, the first carrier and the second carrier being orthogonal to each other.

14. The receiver as claimed in claim 8, wherein when obtaining the channel estimation value of an n-th data symbol in the data symbol sequence, where n is an integer, the plurality of pilot blocks are generated from an (n−K+1)-th pilot symbol to an (n+K)-th pilot symbol in the pilot symbol sequence, where K is a natural number.

15. The receiver as claimed in claim 8, wherein the plurality of pilot blocks have a same length.

16. A transceiver including a transmitting section for transmitting a signal including a combined symbol sequence that has a plurality of slots and includes data symbols and pilot symbols, and a receiving section for receiving and demodulating the signal, said receiving section comprising:

means for detecting positions of the pilot symbols in the combined symbol sequence;

means for generating pilot blocks by extracting, in a plurality of slots, the pilot symbols from the combined symbol sequence in response to a result of the detection;

means for obtaining channel estimation values by calculating a weighted sum of average values of the pilot symbols included in the pilot blocks;

means for acquiring from the combined symbol sequence a data symbol sequence in accordance with the result of the detection;

means for compensating for channel fluctuations of the data symbol sequence using the channel estimation values; and means for controlling the weighting in response to a rate of the channel fluctuations by using at least the pilot symbols included in the pilot blocks.

17. A transceiver including a transmitting section for transmitting a signal including a data symbol sequence and a pilot symbol sequence parallel to the data symbol sequence, and a receiving section for receiving and demodulating the signal, said receiving section comprising:

means for generating a plurality of pilot blocks from the pilot symbol sequence;

means for obtaining channel estimation values by calculating a weighted sum of average values of the pilot symbols in the pilot blocks;

means for compensating for channel fluctuations of the data symbol sequence using the channel estimation values; and means for controlling the weighting in response to a rate of the channel fluctuations by using at least the pilot symbols included in the pilot blocks.

18. A receiving method of receiving and demodulating a signal including a combined symbol sequence that has a plurality of slots and includes data symbols and pilot symbols, said receiving method comprising the steps of:

detecting positions of the pilot symbols in the combined symbol sequence;

generating pilot blocks by extracting, in a plurality of slots, the pilot symbols from the combined symbol sequence in response to a result of the detection;

obtaining channel estimation values by calculating a weighted sum of average values of the pilot symbols in the pilot blocks;

acquiring from the combined symbol sequence a data symbol sequence in accordance with the result of the detection; and compensating for channel fluctuations of the data symbol sequence using the channel estimation value, wherein the weighting is controlled in response to a rate of the channel fluctuations by using at least the pilot symbols included in the pilot blocks.

19. A receiving method of receiving and demodulating a signal including a data symbol sequence and a pilot symbol sequence parallel to the data symbol sequence, said receiving method comprising the steps of:

generating a plurality of pilot blocks from the pilot symbol sequence;

obtaining channel estimation values by calculating a weighted sum of average values of the pilot symbols in the pilot blocks; and compensating for channel fluctuations of the data symbol sequence using the channel estimation value, wherein the weighting is controlled in response to a rate of the channel fluctuations by using at least the pilot symbols included in the pilot blocks.

* * * * *

UNITED STATES PATENT AND TRADEMARK OFFICE
CERTIFICATE OF CORRECTION

PATENT NO. : 6,904,078 B1
DATED : June 7, 2005
INVENTOR(S) : Sadayuki Abeta et al.

It is certified that error appears in the above-identified patent and that said Letters Patent is hereby corrected as shown below:

Title page,
Item [56], References Cited, OTHER PUBLICATIONS, add the following:
-- Japanese Official Notice of Rejection Patent Application No.: 11-541351 --.

Column 3,
Line 4, change "IDS/CDMA" to -- DS/CDMA --.
Line 42, change "$\alpha_{-1}$" to -- $\alpha_1$ --.

Column 7,
Line 57, after "accordance" remove ".".

Column 10,
Line 9, change "estimated" to -- (estimated --.

Line 13, change " $\bar{\xi}$ " to -- $\hat{\xi}$ --.

Column 19,
Lines 14 and 19, change "(Para_)" to -- Para_ C) --.
Line 16, change "(TM_)" to -- (TM_ C) --.
Line 21, change "method" to -- method). --.

Column 21,
Line 34, change "symbols." to -- symbols --.

Signed and Sealed this

Twenty-eighth Day of February, 2006

JON W. DUDAS
*Director of the United States Patent and Trademark Office*

UNITED STATES PATENT AND TRADEMARK OFFICE
CERTIFICATE OF CORRECTION

PATENT NO. : 6,904,078 B1
DATED : June 7, 2005
INVENTOR(S) : Sadayuki Abeta et al.

It is certified that error appears in the above-identified patent and that said Letters Patent is hereby corrected as shown below:

<u>Title page,</u>
Item [56], References Cited, OTHER PUBLICATIONS, add the following:
-- Japanese Official Notice of Rejection Patent Application No.: 11-541351 --.

<u>Column 3,</u>
Line 4, change "IDS/CDMA" to -- DS/CDMA --.
Line 42, change "$\alpha\text{-}_1$" to -- $\alpha_{-1}$ --.

<u>Column 7,</u>
Line 57, after "accordance" remove ".".

<u>Column 10,</u>
Line 9, change "estimated" to -- (estimated --.

Line 13, change "$\bar{\xi}$" to -- $\hat{\xi}$ --.

<u>Column 19,</u>
Lines 14 and 19, change "(Para_)" to -- Para_ C) --.
Line 16, change "(TM_)" to -- (TM_ C) --.
Line 21, change "method" to -- method). --.

<u>Column 21,</u>
Line 34, change "symbols." to -- symbols --.

This certificate supersedes Certificate of Correction issued February 28, 2006.

Signed and Sealed this

Twenty-third Day of May, 2006

JON W. DUDAS
*Director of the United States Patent and Trademark Office*